(12) United States Patent
Burstein

(10) Patent No.: US 11,032,470 B2
(45) Date of Patent: Jun. 8, 2021

(54) SENSORS ARRANGEMENT AND SHIFTING FOR MULTISENSORY SUPER-RESOLUTION CAMERAS IN IMAGING ENVIRONMENTS

(71) Applicant: Intel Corporation, Santa Clara, CA (US)

(72) Inventor: Alex Burstein, Netanya (IL)

(73) Assignee: INTEL CORPORATION, Santa Clara, CA (US)

( * ) Notice: Subject to any disclaimer, the term of this patent is extended or adjusted under 35 U.S.C. 154(b) by 15 days.

(21) Appl. No.: 16/365,990

(22) Filed: Mar. 27, 2019

(65) Prior Publication Data
US 2019/0222752 A1 Jul. 18, 2019

Related U.S. Application Data

(60) Provisional application No. 62/725,056, filed on Aug. 30, 2018.

(51) Int. Cl.
*H04N 5/232* (2006.01)
*H04N 5/222* (2006.01)
*H04N 5/349* (2011.01)
*H04N 9/093* (2006.01)

(52) U.S. Cl.
CPC ....... *H04N 5/23232* (2013.01); *H04N 5/2224* (2013.01); *H04N 5/23222* (2013.01); *H04N 5/232935* (2018.08); *H04N 5/349* (2013.01); *H04N 9/093* (2013.01)

(58) Field of Classification Search
CPC ............... H04N 5/23232; H04N 5/349; H04N 5/23222; H04N 5/2224; H04N 5/232935; H04N 9/093
See application file for complete search history.

(56) References Cited

U.S. PATENT DOCUMENTS

| | | | | |
|---|---|---|---|---|
| 5,640,206 A | * | 6/1997 | Kinoshita | H04N 9/093 348/264 |
| 6,108,036 A | * | 8/2000 | Harada | H04N 5/2254 348/219.1 |
| 7,903,156 B2 | * | 3/2011 | Nobori | H04N 5/217 348/272 |
| 2008/0158245 A1 | * | 7/2008 | Lieb | G09G 3/007 345/596 |
| 2011/0211097 A1 | * | 9/2011 | Omori | H04N 5/2254 348/264 |
| 2017/0366747 A1 | * | 12/2017 | Wen | H04N 5/2621 |
| 2018/0095269 A1 | * | 4/2018 | Mizoguchi | H04N 9/317 |

* cited by examiner

*Primary Examiner* — Lin Ye
*Assistant Examiner* — John H Morehead, III
(74) *Attorney, Agent, or Firm* — Jaffery Watson Mendonsa & Hamilton LLP

(57) ABSTRACT

A mechanism is described for facilitating sensors arrangement and shifting for multisensory super-resolution cameras in imaging environments, according to one embodiment. A method of embodiments, as described herein, includes arranging sensors of a camera such that pixel centers of pixels of an image are spread evenly across a pixel area having pixel planes corresponding to the sensors, where the image is captured by the camera. The method may further include re-arranging the sensors by dividing the sensors in pairs of sensors, where each pair of sensors corresponds to a pair of pixel planes, and shifting the sensors diagonally such that the corresponding pixel planes are adjusted accordingly for improving quality of the image.

17 Claims, 17 Drawing Sheets

SENSORS ARRANGEMENT AND SHIFTING FOR MULTISENSORY SUPER-RESOLUTION CAMERAS IN IMAGING ENVIRONMENTS

RELATED APPLICATION

This application claims the benefit and priority to U.S. Provisional Application No. 62/725,056, entitled SENSORS ARRANGEMENT FOR MULTISENSORY SUPER-RESOLUTION CAMERAS, by Alex Burstein, et al., filed Aug. 30, 2018, the entire contents of which are incorporated herein by reference.

FIELD

Embodiments described herein relate generally to data processing and more particularly to facilitate sensors arrangement and shifting for multisensory super-resolution cameras in imaging environments.

BACKGROUND

Conventional techniques do not provide for super-resolution cameras with multiple sensors and thus are incapable of allowing for a multiplication of physical sensors.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments, as described herein, may be practiced without these specific details. In other instances, well-known circuits, structures and techniques have not been shown in detail in order not to obscure the understanding of this description.

Embodiments provide for a novel sensor arrangement for multisensory digital camera to achieve high resolution images, where a high-resolution image is combined using various relatively low-resolution images. In one embodiment, a novel technique is provided for a sensor arrangement to evenly spread any pixel centers, while keeping all the virtual pixels in equal size, such as ¼ by ¼, of a physical pixel.

Figure 1:
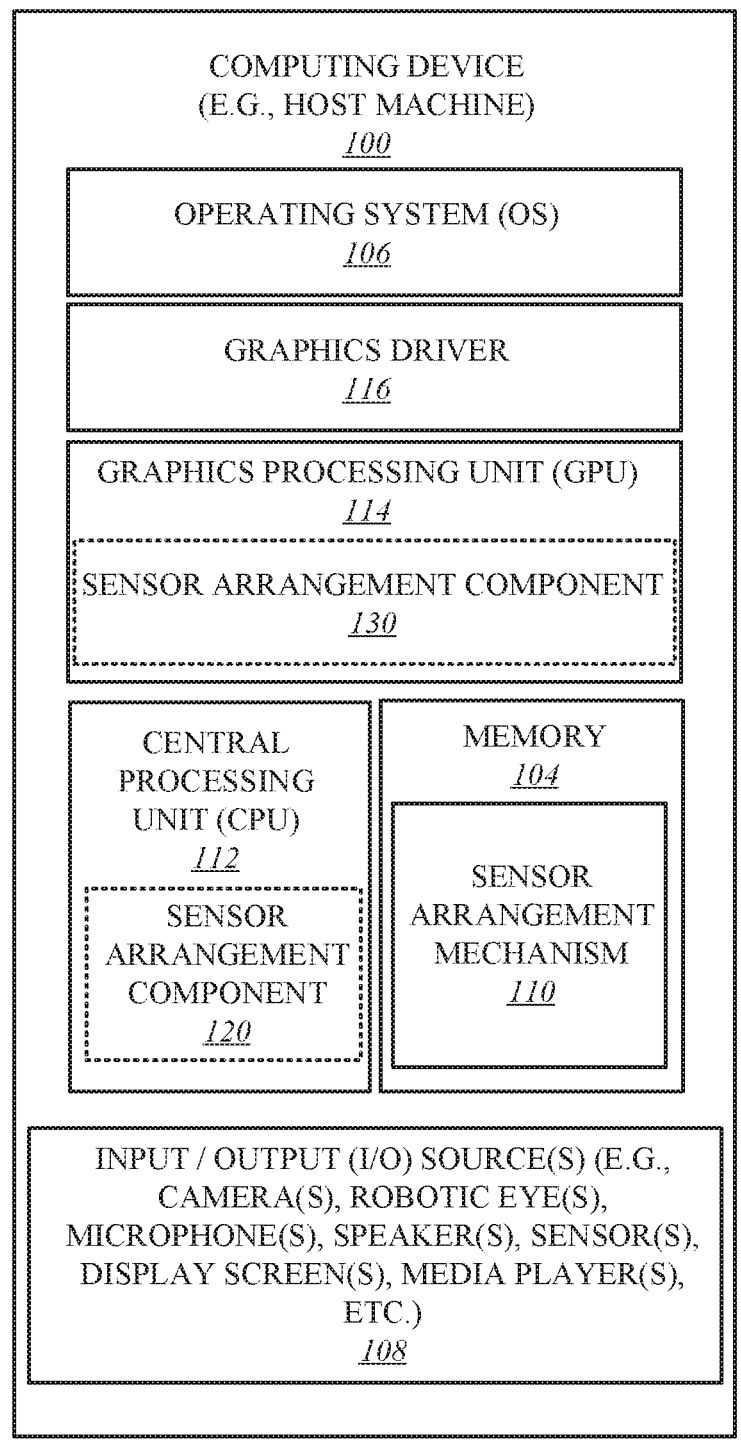
FIG. 1 illustrates a computing device employing a sensor arrangement mechanism according to one embodiment.

FIG. 1 illustrates a computing device 100 employing a sensor arrangement mechanism 110 according to one embodiment. Computing device 100 represents a communication and data processing device including or representing (without limitation) smart voice command devices, intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted displays (HMDs), Internet of Things (IoT) devices, laptop computers, desktop computers, server computers, set-top boxes (e.g., Internet-based cable television set-top boxes, etc.), global positioning system (GPS)-based devices, automotive infotainment devices, etc.

In some embodiments, computing device 100 includes or works with or is embedded in or facilitates any number and type of other smart devices, such as (without limitation) autonomous machines or artificially intelligent agents, such as a mechanical agents or machines, electronics agents or machines, virtual agents or machines, electro-mechanical agents or machines, etc. Examples of autonomous machines or artificially intelligent agents may include (without limitation) robots, autonomous vehicles (e.g., self-driving cars, self-flying planes, self-sailing boats, etc.), autonomous equipment (self-operating construction vehicles, self-operating medical equipment, etc.), and/or the like. Further, "autonomous vehicles" are not limited to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 100 may include a computer platform hosting an integrated circuit ("IC"), such as a system on a chip ("SoC" or "SOC"), integrating various hardware and/or software components of computing device 100 on a single chip. For example, computing device 100 comprises a data processing device having one or more processors including (but not limited to) central processing unit 112 and graphics processing unit 114 that are co-located on a common semiconductor package.

As illustrated, in one embodiment, computing device 100 may include any number and type of hardware and/or software components, such as (without limitation) graphics processing unit ("GPU" or simply "graphics processor") 114, graphics driver (also referred to as "GPU driver", "graphics driver logic", "driver logic", user-mode driver (UMD), UMD, user-mode driver framework (UMDF), UMDF, or simply "driver") 116, central processing unit ("CPU" or simply "application processor") 112, memory 104, network devices, drivers, and/or the like, as well as input/output (I/O) source(s) 108, such as touchscreens, touch panels, touch pads, virtual or regular keyboards, virtual or regular mice, ports, connectors, etc. Computing device 100 may include operating system (OS) 106 serving as an interface between hardware and/or physical resources of the computing device 100 and a user.

It is to be appreciated that a lesser or more equipped system than the example described above may be preferred for certain implementations. Therefore, any configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). Terms like "logic", "module", "component", "engine", "circuitry", "element", and "mechanism" may include, by way of example, software, hardware, firmware, and/or a combination thereof.

In one embodiment, as illustrated, sensor arrangement mechanism 110 may be hosted by memory 104 in communication with I/O source(s) 108, such as microphones, speakers, etc., of computing device 100. In another embodiment, sensor arrangement mechanism 110 may be part of or hosted by operating system 106. In yet another embodiment, sensor arrangement mechanism 110 may be hosted or facilitated by graphics driver 116. In yet another embodiment, sensor arrangement mechanism 110 may be hosted by or part of graphics processing unit ("GPU" or simply graphics processor") 114 or firmware of graphics processor 114; for example, sensor arrangement mechanism 110 may be embedded in or implemented as part of the processing hardware of graphics processor 114 in the form of misuse assessment component 130. Similarly, in yet another embodiment, sensor arrangement mechanism 110 may be hosted by or part of central processing unit ("CPU" or simply "application processor") 112; for example, sensor arrangement mechanism 110 may be embedded in or implemented as part of the processing hardware of application processor 112 in the form of misuse assessment component 120.

For example, forward projection components 120, 130 and/or any elements of sensor arrangement mechanism 110 may be implemented by one or more analog or digital circuits, logic circuits, programmable processors, programmable controllers, GPUs, digital signal processors (DSPs), application specific integrated circuits (ASICs), programmable logic devices (PLDs), and/or field programmable logic devices (FPLDs).

It is contemplated that this novel technique is not limited to a software implementation or a hardware implementation and, as will be further described in this document, this novel technique may be applied and implemented in software, hardware, firmware, or any combination thereof. It is, therefore, further contemplated that embodiments are not limited to certain implementation or hosting of sensor arrangement mechanism 110 and that one or more portions or components of sensor arrangement mechanism 110 may be employed or implemented as hardware, software, firmware, or any combination thereof. Further, as used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events Computing device 100 may host network interface device(s) to provide access to a network, such as a LAN, a wide area network (WAN), a metropolitan area network (MAN), a personal area network (PAN), Bluetooth, a cloud network, a mobile network (e.g., $3^{rd}$ Generation (3G), $4^{th}$ Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine-executable instructions that, when executed by one or more machines such as a computer, a data processing machine, a data processing device, network of computers, or other electronic devices, may result in the one or more machines carrying out operations in accordance with embodiments described herein. As described with reference to FIG. 1, a machine may include one or more processors, such as a CPU, a GPU, etc. A machine-readable medium may include, but is not limited to, floppy diskettes, optical disks, Compact Disc-Read Only Memories (CD-ROMs), magneto-optical disks, ROMs, Random Access Memories (RAMs), Erasable Programmable Read Only Memories (EPROMs), Electrically Erasable Programmable Read Only Memories (EEPROMs), magnetic or optical cards, flash memory, or other type of media/machine-readable medium suitable for storing machine-executable instructions.

For example, when reading any of the apparatus, method, or system claims of this patent to cover a purely software and/or firmware implementation, at least one element of sensor arrangement components 120, 130 and/or sensor arrangement mechanism 110 may be expressly defined to include a non-transitory computer readable storage device or storage disk such as a memory, a digital versatile disk (DVD), a compact disk (CD), a Blu-ray disk, etc., including the software and/or firmware.

Moreover, one or more elements of sensor arrangement components 120, 130 and/or sensor arrangement mechanism 110 may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout this document, the term "user" may be interchangeably referred to as "viewer", "observer", "speaker", "person", "individual", "end-user", "developer", "programmer", "administrators", and/or the like. For example, in some cases, a user may refer to an end-user, such as a consumer accessing a client computing device, while, in some other cases, a user may include a developer, a programmer, a system administrator, etc., accessing a workstation serving as a client computing device. It is to be noted that throughout this document, terms like "graphics domain" may be referenced interchangeably with "graphics processing unit", "graphics processor", or simply "GPU"; similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document.

Further, throughout this document, terms like "request", "query", "job", "work", "work item", and "workload" are referenced interchangeably. Similarly, an "application" or "agent" may refer to or include a computer program, a software application, a game, a workstation application, etc., offered through an application programming interface (API), such as a free rendering API, such as Open Graphics Library (OpenGL®), DirectX® 11, DirectX® 12, etc., where "dispatch" may be interchangeably referenced as "work unit" or "draw", while "application" may be interchangeably referred to as "workflow" or simply "agent".

For example, a workload, such as that of a three-dimensional (3D) game, may include and issue any number and type of "frames" where each frame may represent an image (e.g., sailboat, human face). Further, each frame may include and offer any number and type of work units, where each work unit may represent a part (e.g., mast of sailboat, forehead of human face) of the image (e.g., sailboat, human face) represented by its corresponding frame. However, for the sake of consistency, each item may be referenced by a single term (e.g., "dispatch", "agent", etc.) throughout this document.

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

Figure 2:
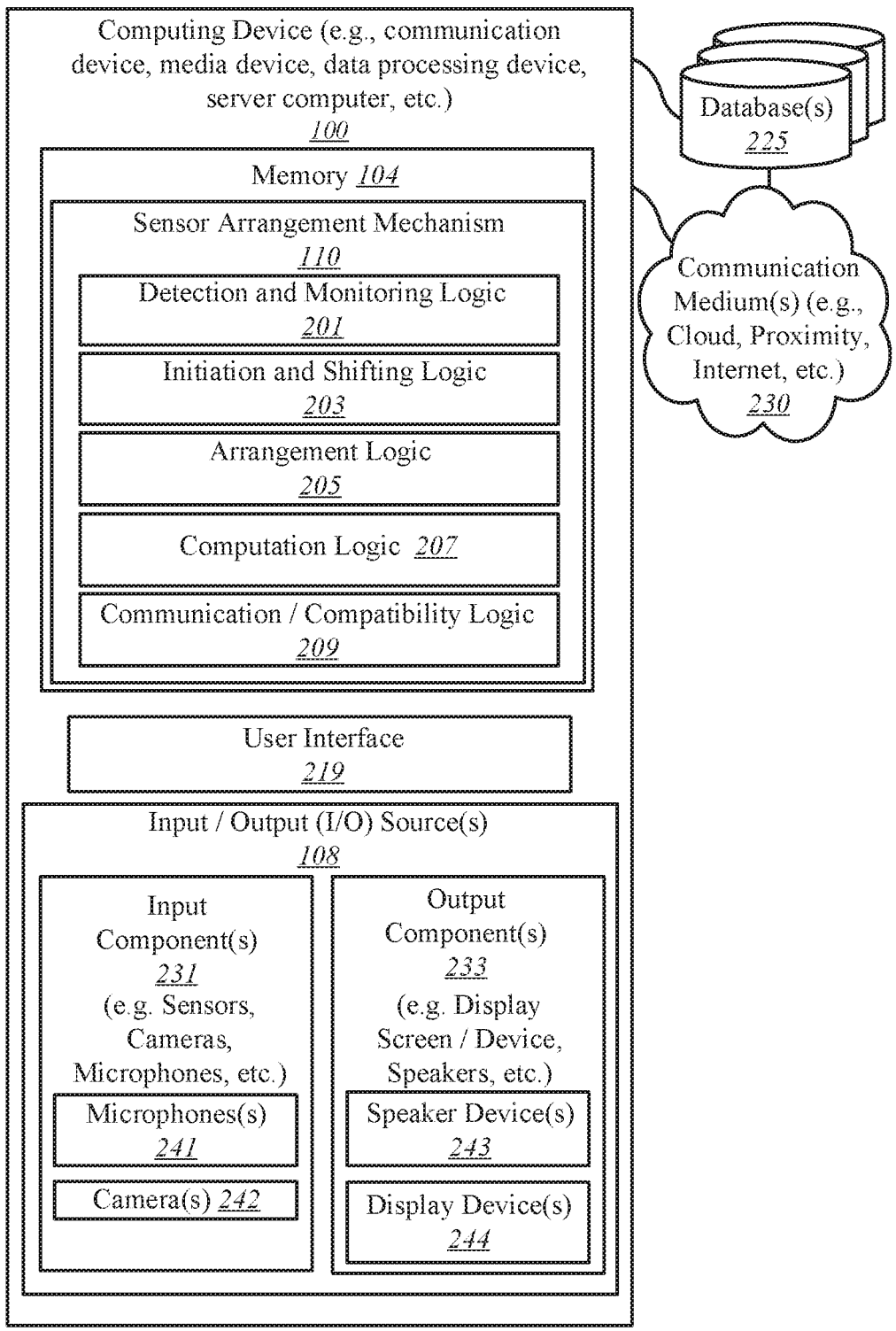
FIG. 2 illustrates the sensor arrangement mechanism of FIG. 1 according to one embodiment.

FIG. 2 illustrates sensor arrangement mechanism 110 of FIG. 1 according to one embodiment. For brevity, many of the details already discussed with reference to FIG. 1 are not repeated or discussed hereafter. In one embodiment, sensor arrangement mechanism 110 may include any number and type of elements or components, such as (but not limited to): detection and monitoring logic 201; initiation and shifting logic 203; arrangement logic 205; computation logic 207; and communication/compatibility logic 209.

Computing device 100 further includes user interface 219 (e.g., graphical user interface (GUI)-based user interface, Web browser, cloud-based platform user interface, software application-based user interface, other user or application programming interfaces (APIs), etc.). Computing device 100 may further include I/O source(s) 108 having input component(s) 231, such as camera(s) 242 (e.g., Intel® RealSense™ camera), microphone(s) 241, sensors, detectors, keyboards, mice, etc., and output component(s) 233, such as display device(s) or simply display(s) 244 (e.g., integral displays, tensor displays, projection screens, display screens, etc.), speaker devices(s) or simply speaker(s), etc.

Computing device 100 is further illustrated as having access to and/or being in communication with one or more database(s) 225 and/or one or more of other computing devices over one or more communication medium(s) 230 (e.g., networks such as a proximity network, a cloud network, an intranet, the Internet, etc.).

In some embodiments, database(s) 225 may include one or more of storage mediums or devices, repositories, data sources, etc., having any amount and type of information, such as data, metadata, etc., relating to any number and type of applications, such as data and/or metadata relating to one or more users, physical locations or areas, applicable laws, policies and/or regulations, user preferences and/or profiles, security and/or authentication data, historical and/or preferred details, and/or the like.

As aforementioned, computing device 100 may host I/O source(s) 108 including input component(s) 231 and output component(s) 233. In one embodiment, input component(s) 231 may include a sensor array including, but not limited to, microphone(s) 241 (e.g., ultrasound microphones), camera(s) 242 (e.g., two-dimensional (2D) cameras, three-dimensional (3D) cameras, infrared (IR) cameras, depth-sensing cameras, etc.), radio components, radar components, scanners, and/or accelerometers, etc. Similarly, output component(s) 233 may include any number and type of display device(s) 244, projectors, light-emitting diodes (LEDs), speaker(s) 243, and/or vibration motors, etc.

As aforementioned, terms like "logic", "module", "component", "engine", "circuitry", "element", and "mechanism" may include, by way of example, software, hardware, firmware, and/or any combination thereof. For example, logic may itself be or include or be associated with circuitry at one or more devices, such as sensor arrangement component 130 and/or sensor arrangement component 120 hosted by application processor 112 and/or graphics processor 114, respectively, of FIG. 1 having to facilitate or execute the corresponding logic to perform certain tasks.

Figure 3A:
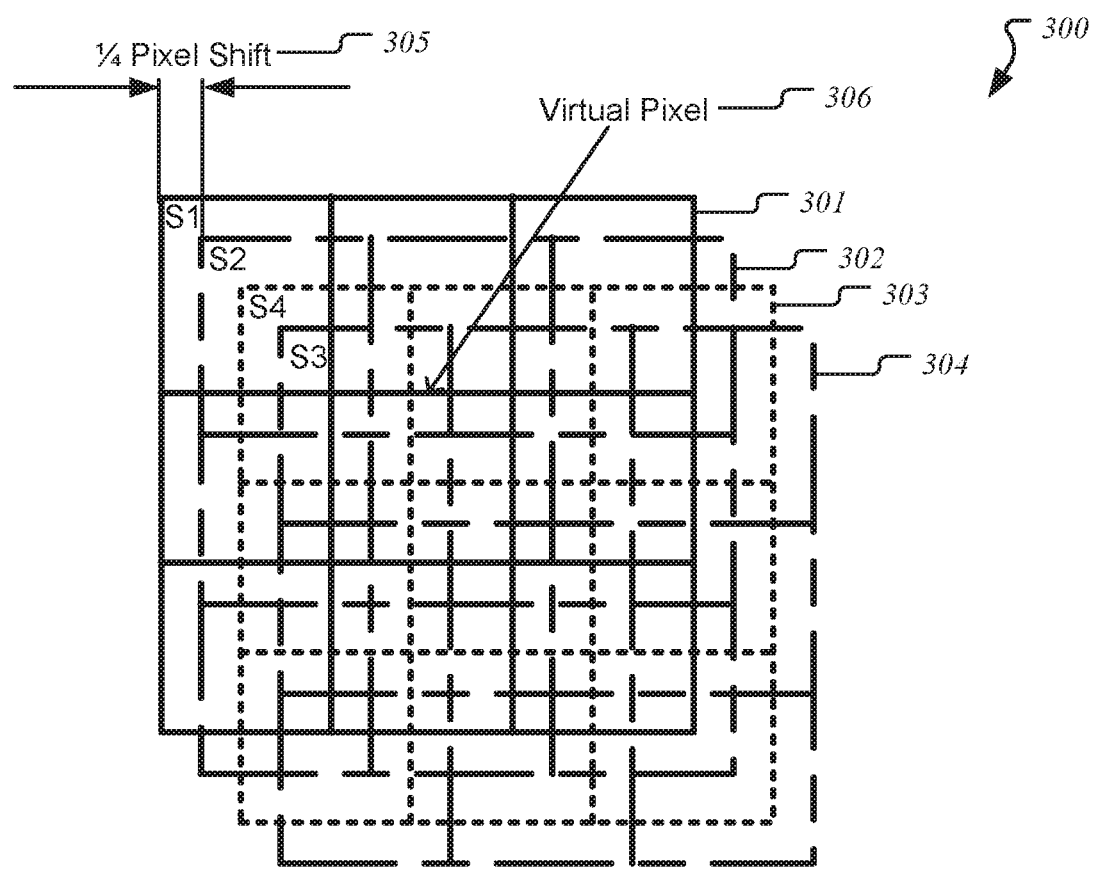
FIGS. 3A and 3B illustrate diagonal shifting of pixel areas according to one embodiment.

As illustrated with reference to FIG. 3A, pixel area 300 having pixel planes 301, 302, 303, 304 corresponds to four sensors of a camera, where the sensors are aligned with a spatial offset of ¼ pixel pitch diagonally, as shown by pixel shift 305. This offset allows for calculation of virtual pixels, such as virtual pixel 306, with each pixel having a smaller size than that of a physical sensor's pixel. As previously described, using this technique, the light is not uniform in spreading to the pixel area 300, while an intensity value captured by each pixel is correct merely in the pixel center. This assumption also uses various image reconstruction algorithms, such as de-mosaicking algorithm, re-scaling algorithm, etc.

Figure 3B:
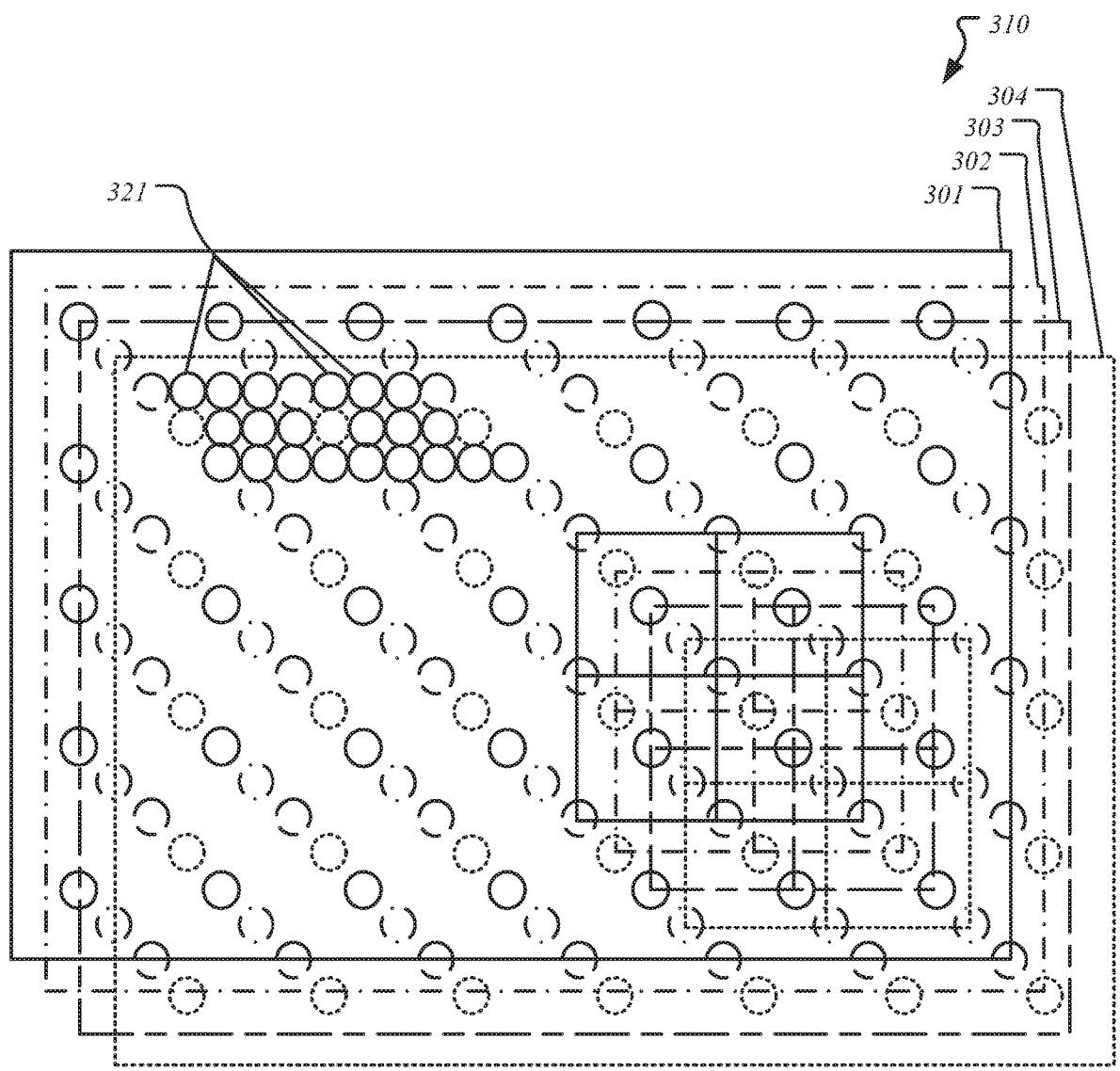

When sensors are diagonally shifted as shown in pixel planes 301, 302, 303, 304, the distances between the centers of the pixels get significantly smaller, shown as pixel shift 305. Now referring to pixel area 310 of FIG. 3B, in diagonal shifting, any of the locations within pixel area 310 represented by fading circles, such as circles 321, are regarded as not being captured by any of the sensor's pixels. This discrepancy often leads to unequal image sampling and artifacts in combined high-resolution images due to virtual pixels calculation tolerances.

Embodiments provide for a novel technique, as facilitated by sensor arrangement mechanism 110 and/or one or more of sensor arrangement components 120, 130, to spread the pixel centers more evenly while keeping all the virtual pixels in equal sizes of ¼×¼ of a physical pixel. Embodiments offer a novel arrangement of sensors associated with multisensory super-resolution cameras for achieving high-resolution image outputs as combined from multiple relatively low-resolution images.

In one embodiment, detection and monitoring logic 201 may be used to continuously detect and monitor camera(s) 242 and their multiples sensors, while providing the detected and monitored information to initiation and shifting logic 203 to perform the necessary operations associated with graphical pixel arrangements corresponding to the sensors. For example, to provide a superior image quality, camera(s) 242 may include a global shutter camera with resolution of up to 700M pixels and frame rate of no less than 30 frames per second (FPS).

For example, initiation and shifting logic 203, along with other components of sensor arrangement mechanism 110, may facilitate significant improvements to even those sensors that are already high in resolution. For example, one of the biggest sensors available today may have a resolution a little shy of 50M pixels; however, in applying this novel sensor shift technique, as facilitated by initiation and shifting logic 203, this resolution may be increased many times, such as 16 times the given resolution, or 50M pix×16=800M pixels. It is contemplated and to be noted that these descriptions are merely examples and that embodiments are not limited to any type or size of a sensor or the degree to which its resolution may be improved.

In one embodiment, initiation and shifting logic 203 may prepare a graphical representation of sensors, while arrangement logic 205 offers a unique arrangement (or rearrangement) of these sensors by splitting them into smaller numbers or portions as visualized through their corresponding graphs. For example, in continuing with the example of a camera having four sensors, in one embodiment, arrangement logic 205 may be triggered to arrange the four sensors into two orthogonal diagonals, such as 1) up-left to down-right, and 2) up-right to down-left.

Once this paring is achieved by arrangement logic 205, in one embodiment, these pairs are then placed in a diagonal shift of ¼ from one to another so that (assuming square-shaped pixels) each physical pixel is divided into 16 equal parts by this sensor shift as facilitated by initiation and shifting logic 203. This arrangement and shifting of the sensors provide for an even spreading of any pixel centers, which, in turn, allows for more accurate approximation of virtual pixel values as facilitated by computation logic 207.

Figure 4A:
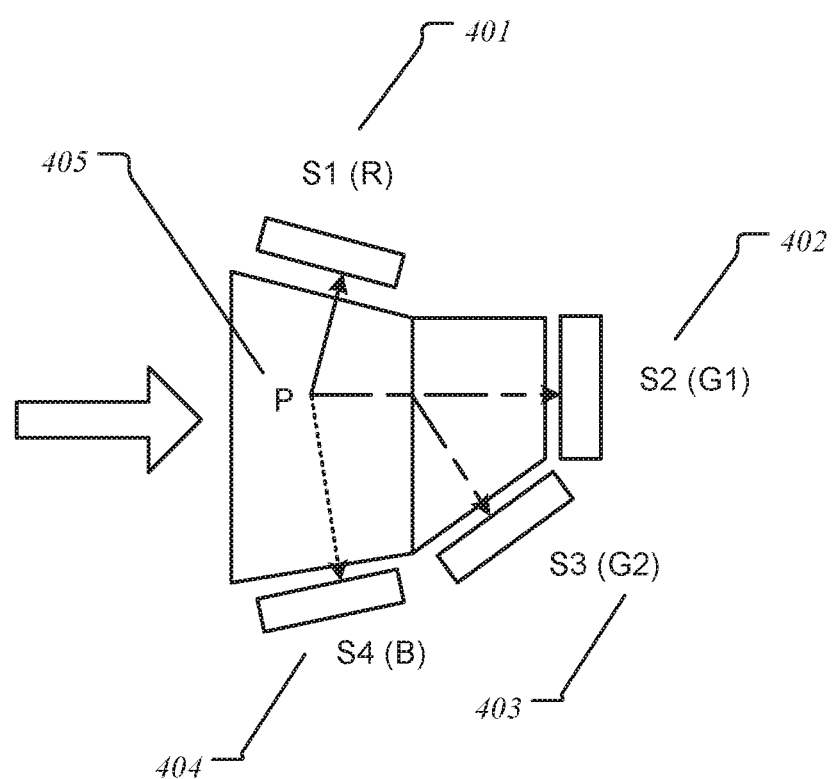
FIG. 4A illustrates an imaging system according to one embodiment.

As illustrated with respect to FIG. 4A, imaging system 400 may refer to or includes a camera system that is the same as or includes one of camera(s) 242 of FIG. 2, having multiple sensors, such as S1 401, S2 402, S3 403, and S4 404. The illustrated four sensors S1 401, S2 402, S3 403, and S4 404 may also be referred to as a three-sensor red, green and blue (RGB) imaging system, where sensor S1 401 corresponds to red, R, sensor S4 404 corresponds to blue, B, while a half-mirrored splitter is added to the optical path of the green, dividing this light into two identical components, such as sensors S2 402 and S3 403 corresponding to green 1, G1, and green 2, G2.

For example, imaging system 400 includes a light splitter, shown as P 405, to break down any incident light into multiple components, such as four components, that are captured by image sensors S1 301, S2 302, S3 303, and S4 304. The effective resolution of this imaging system 400 may be enhanced by spatially offsetting one or more of sensors S1 401, S2 402, S3 403, and S4 404.

Figure 4B:
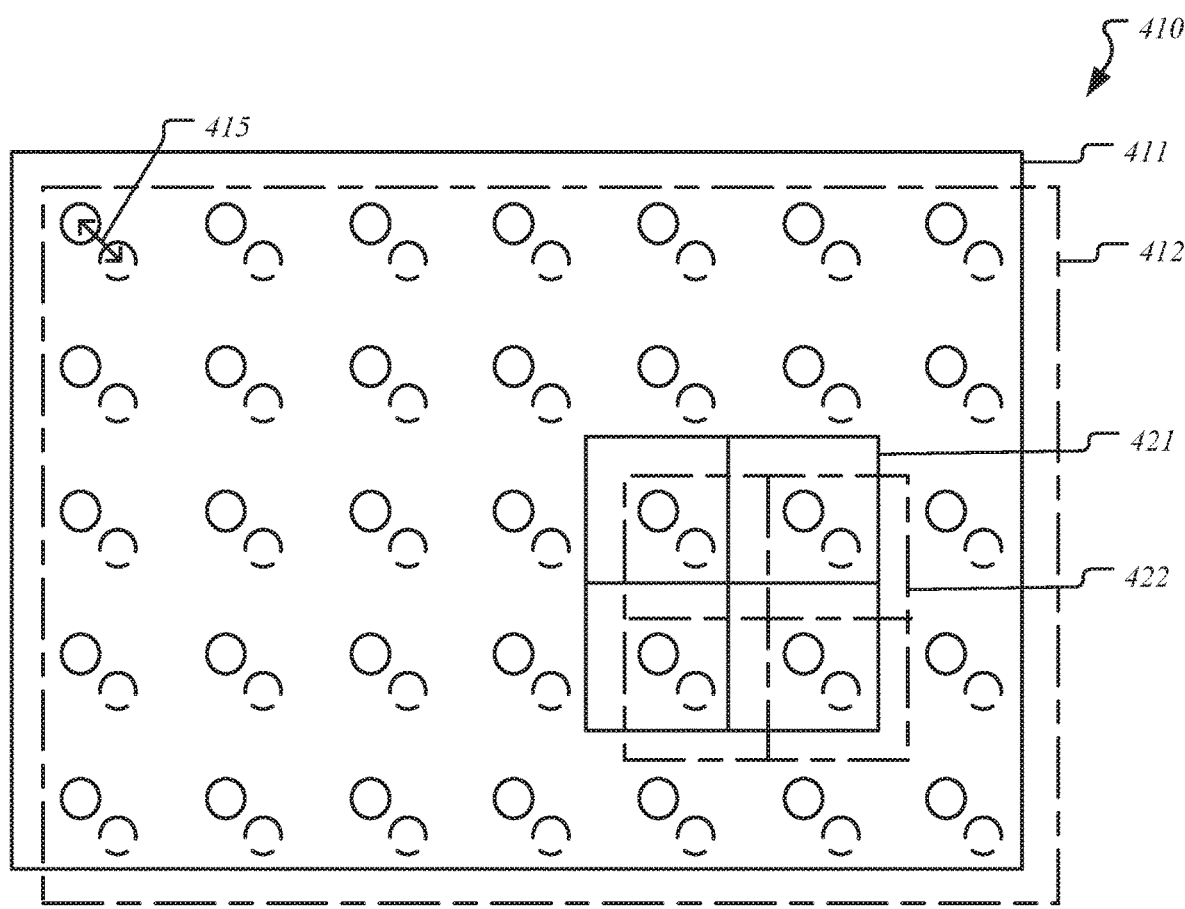
FIG. 4B illustrates a pixel area having pixel planes according to one embodiment.

FIG. 4B illustrates pixel area 410 having pixel planes 411 and 412 corresponding to sensors S1 401 and S2 402 of FIG. 4A. As previously described, this novel arrangement, as facilitated by arrangement logic 205, sensors may be arranged in pairs, such as this pair of sensors S1 401 and S2 402 of FIG. 4A and the pixel planes 411 and 412, respectively. Further, this first pair of sensors S1 401 and S2 402 of FIG. 4A are arranged with a diagonal shift, such as diagonal shift 415, of ¼ pixel pitch in the direction of up-left and down-right. This diagonal shift 415 between pixels or pixel centers is reflected throughout, such as between pixels sets 421 and 422.

Figure 4C:
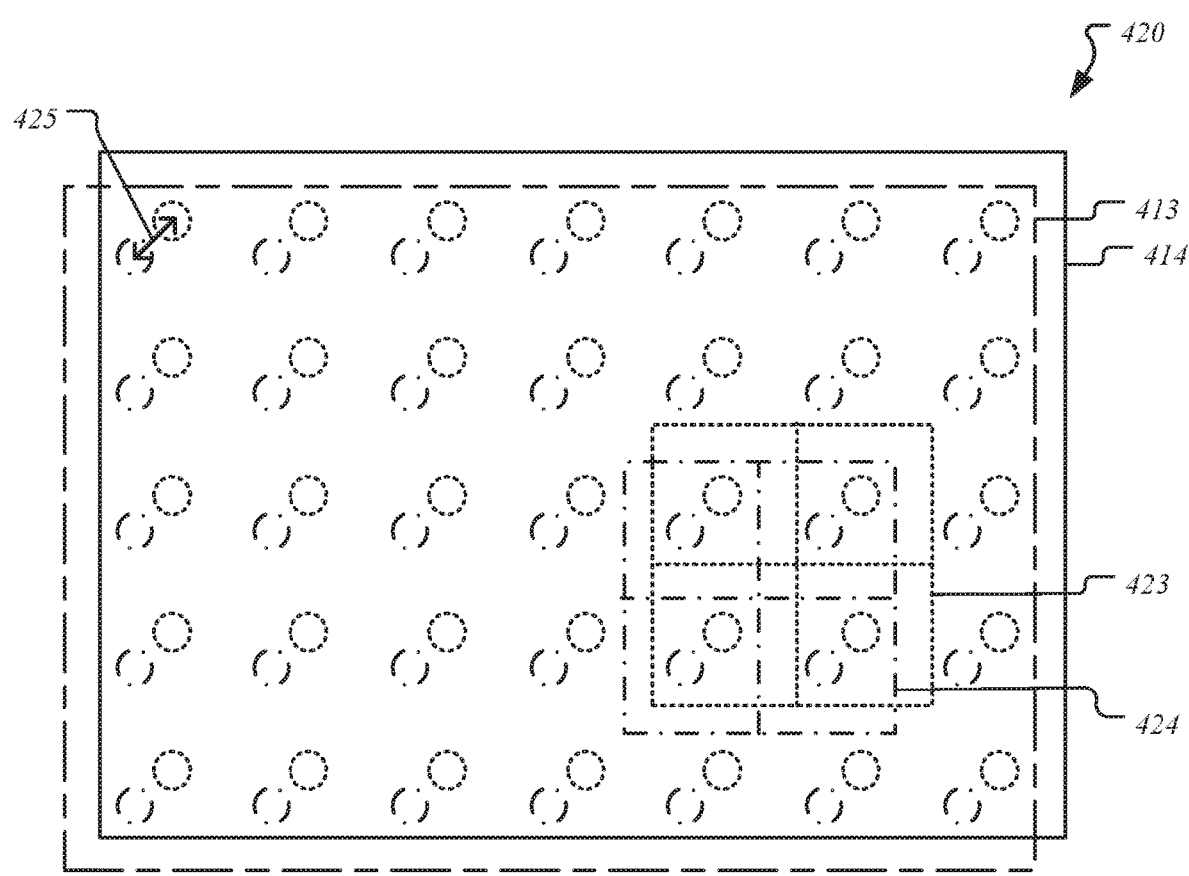
FIG. 4C illustrates a pixel area according to one embodiment.

Similarly, as illustrated with respect to pixel area 420 FIG. 4C, a second pair of sensors S3 403 and S4 404 of FIG. 4A, corresponding to pixel planes 413 and 414, is shown as arranged with diagonal shift 425 of ¼ pixel pitch in the direction of up-right to down-left orthogonal to the first pair. As with FIG. 4B, this diagonal shift 425 reflects and overall shift, such as the corresponding shifting of pixel sets 423 and 424.

As previously described, with compared with any of the conventional techniques, this novel arrangement and shifting technique provides for a more even distribution of pixel centers and results in a more accurate approximation of any virtual pixel values as facilitated by computation logic 207.

Figure 4D:
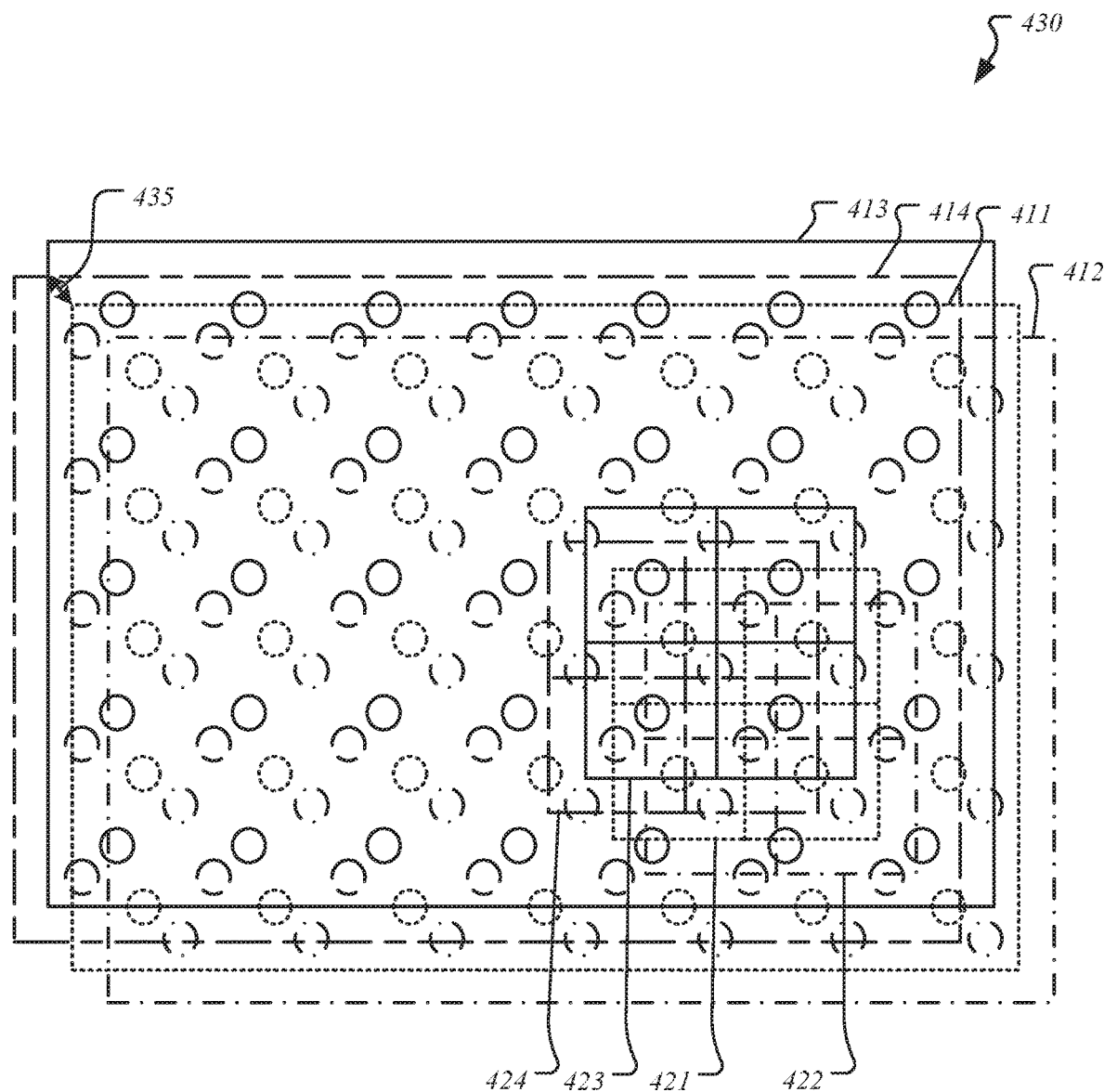
FIG. 4D illustrates a pixel area according to one embodiment.

For example, pixel area 430 of FIG. 4D illustrates this novel arrangement of all four sensors S1 401, S2 402, S3 403, and S4 404 of FIG. 4A as reflected by their corresponding pixel planes 411, 412, 413, and 414. In this illustrated embodiment, diagonal shift 435 of ¼ pixel pitch is applied to facilitate the overall shifting of pixel centers as reflected by the shifting of pixel sets 421, 422, 423, 424. As illustrated, this novel technique of arrangement and shifting allows for even distribution of pixel centers, which, in turn, results in accurate approximation of virtual pixel values and output of images.

As aforementioned, super-resolution provides for a higher resolution image based on one or more of images captured from the same scene. Single sensor super-resolution relates to techniques like temporal video, sensor shift, and low resolution (LR) images, while multiple sensor super-resolution relates to obtaining multi-view images from several cameras or several pictures that are then stitched together to produce a single high-resolution image, and optical system splits where incoming light is split into multiple beams at different wavelengths while combining the resulting data into a super resolution image.

Embodiments relate to a multi-sensor system with optical splitter as illustrated with reference to FIG. 4A, such as using a color separation prism with multiple sensors like two greens, one red, and one blue. This level of high-resolution is achieved by spatially offsetting the two green pixels diagonally as shown in FIG. 4A and further illustrated in FIG. 4E.

Figure 4E:
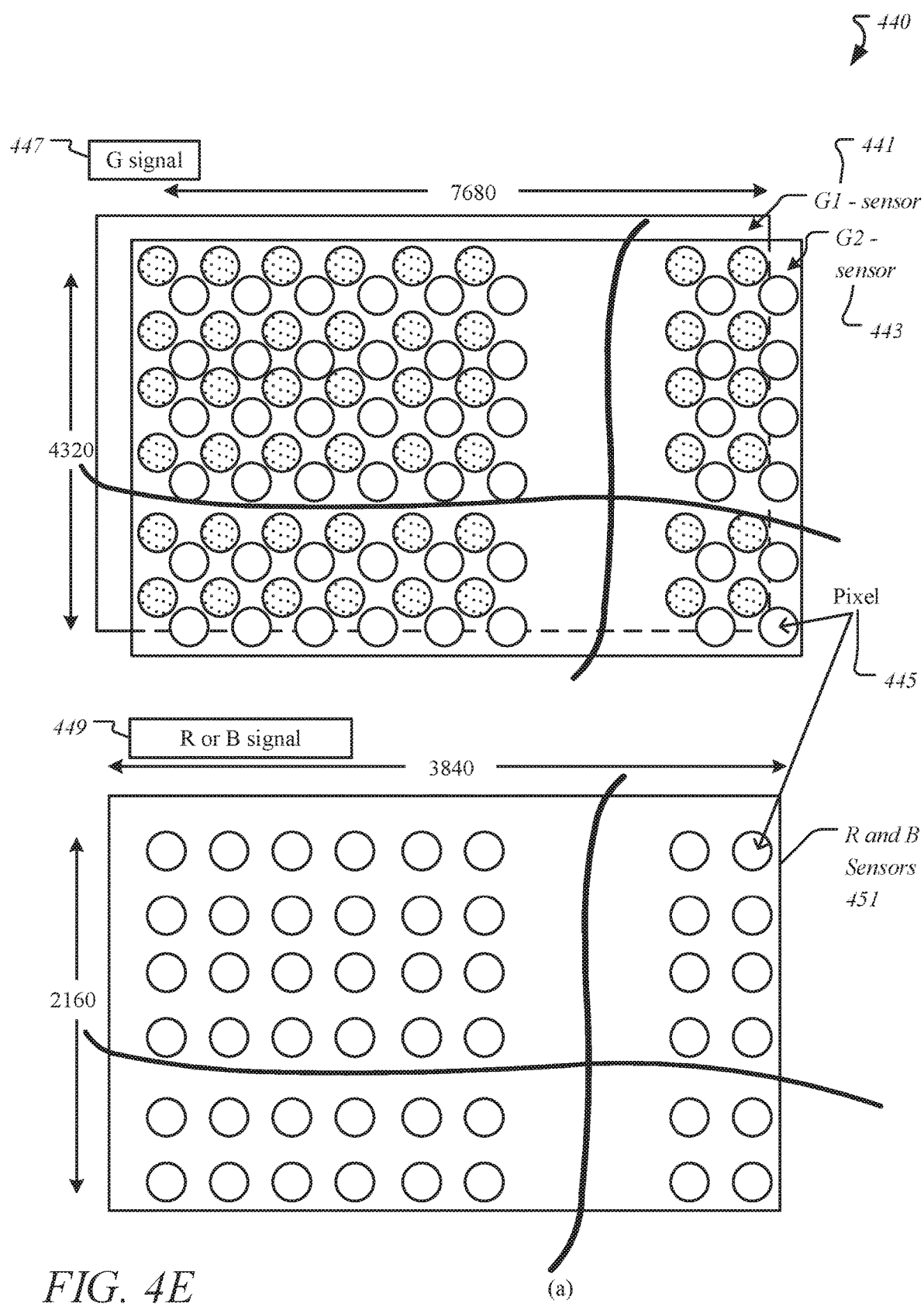
FIG. 4E illustrates a system illustrating shifting of sensors according to one embodiment.

As illustrated with respect to FIG. 4E, system 440 illustrates sensors (green 1) G1 441 and (green 2) G2 443 associated with G signal 447, where the position of G2 sensor 443 is shifted diagonally with respect to G1 sensor 441 to half a pixel pitch, while the positions of R and B sensors 451, corresponding to R or B signal 449, are also shifted horizontally and vertically relative to G1 sensor 441. This pixel arrangement may be equivalent to that of a single-color image sensor with, for example, a Bayer-pattern color filter. The offsetting of the pixels 445 of G1 441 and G2 443 diagonally can double the green signal frequencies, such as Nyquist frequencies, in the horizontal and vertical directions and multiplies the output resolution.

None of the conventional techniques can handle a multi-sensor beam splitter with resolution multiplication of a factor greater than 4. The largest global shutter image sensor in the market today has a resolution lower than 65M pixels, while a rolling shutter image sensor are known for even higher resolution, and/or the like. Embodiments provide for a novel technique that allows for the sensor shift to achieve a resolution of 16 time or more even on the biggest sensor available today. Stated differently, techniques are limited to only 4 times the resolution multiplication, while the novel technique allows for 16 times the resolution multiplication on imaging systems having 4 or more sensors.

Figure 4F:
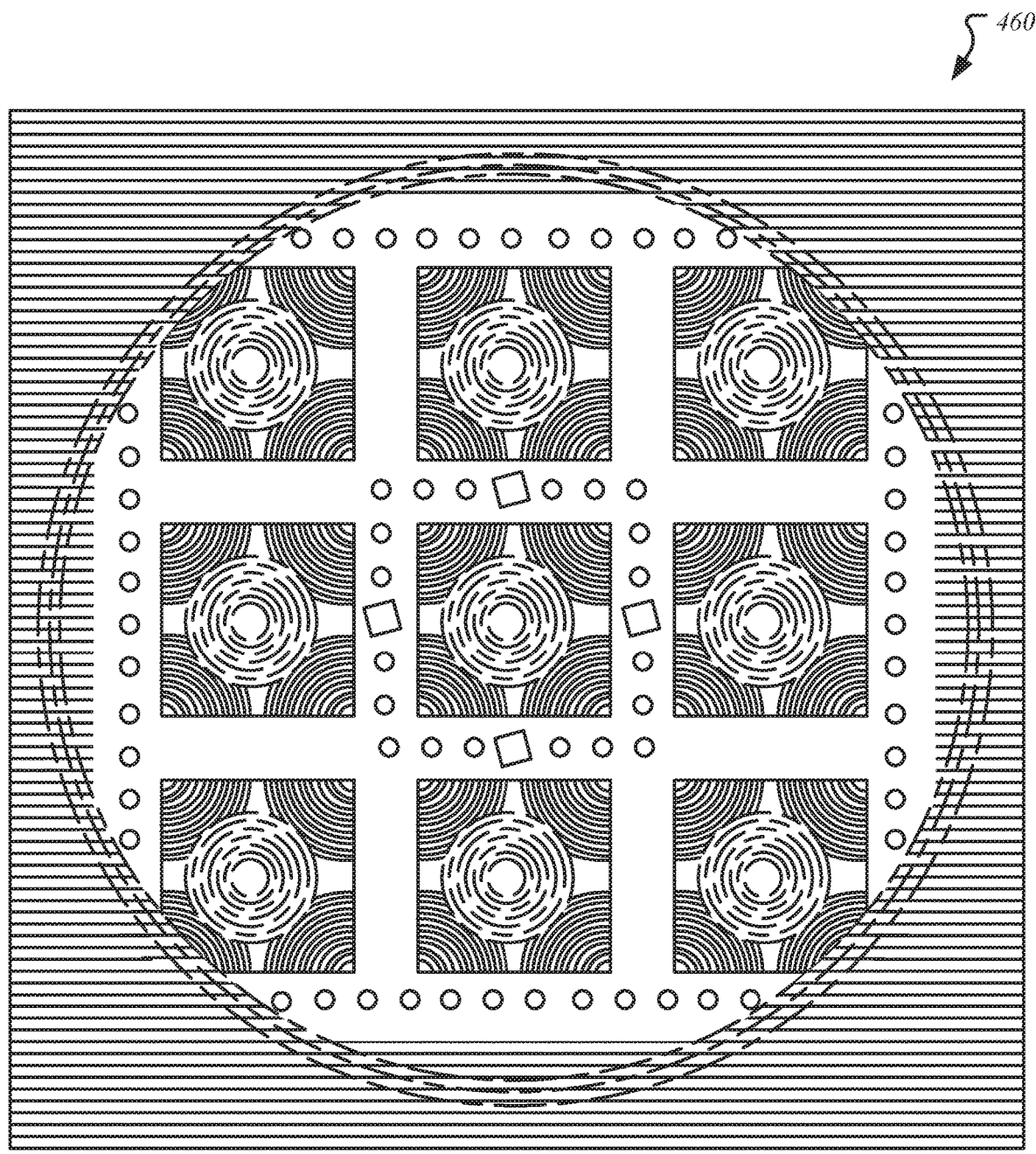
FIGS. 4F, 4G, 4H, and 4I illustrate images as captured and processed according to one embodiment.
Figure 4G:
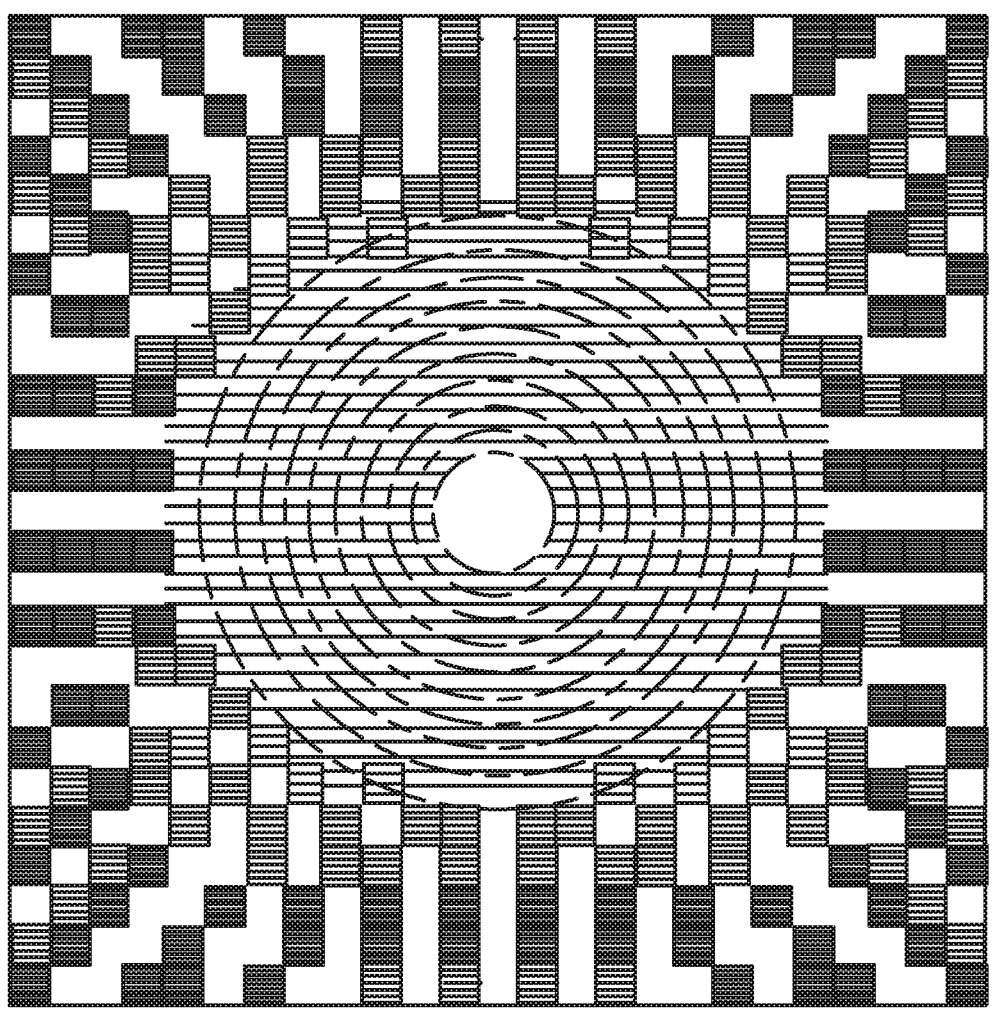
Figure 4H:
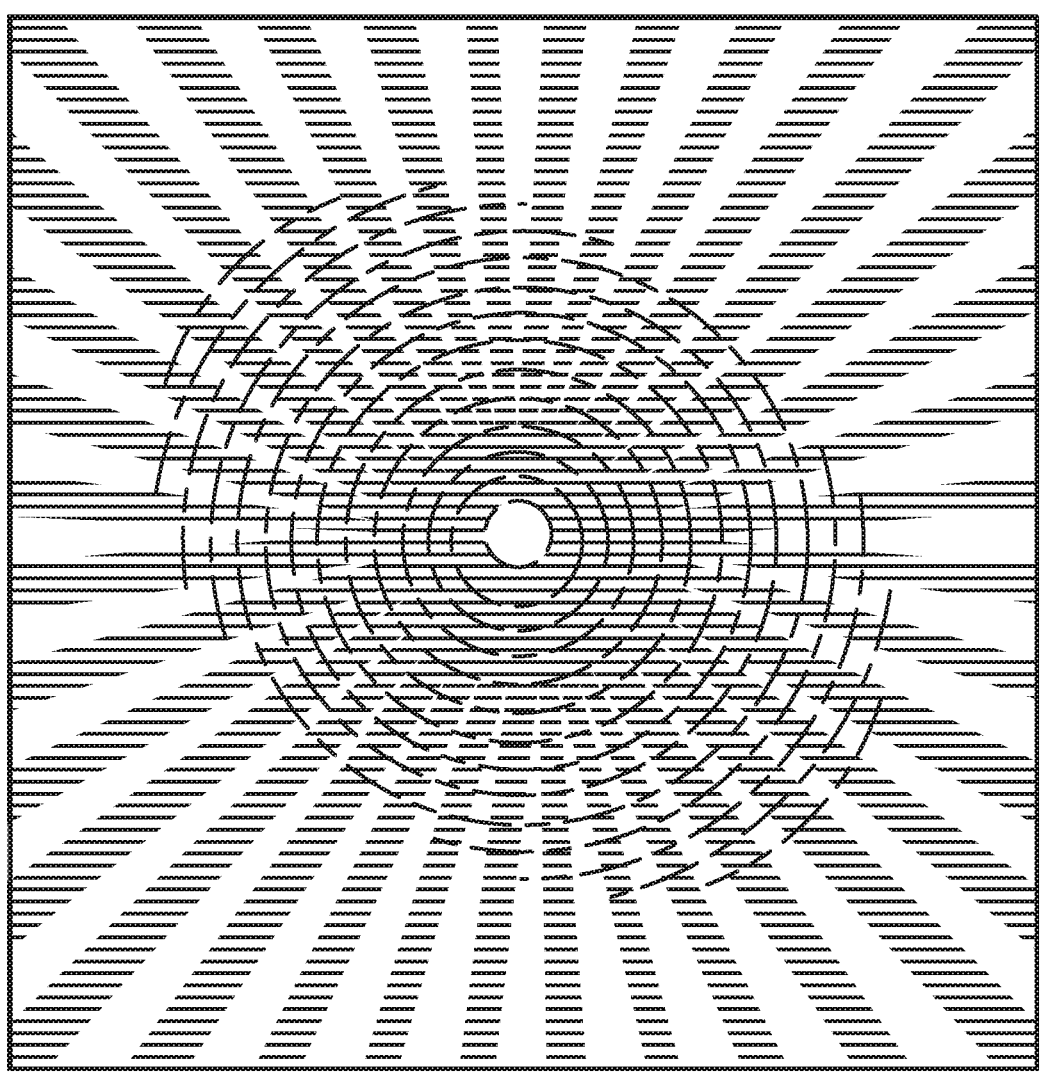
Figure 4I:
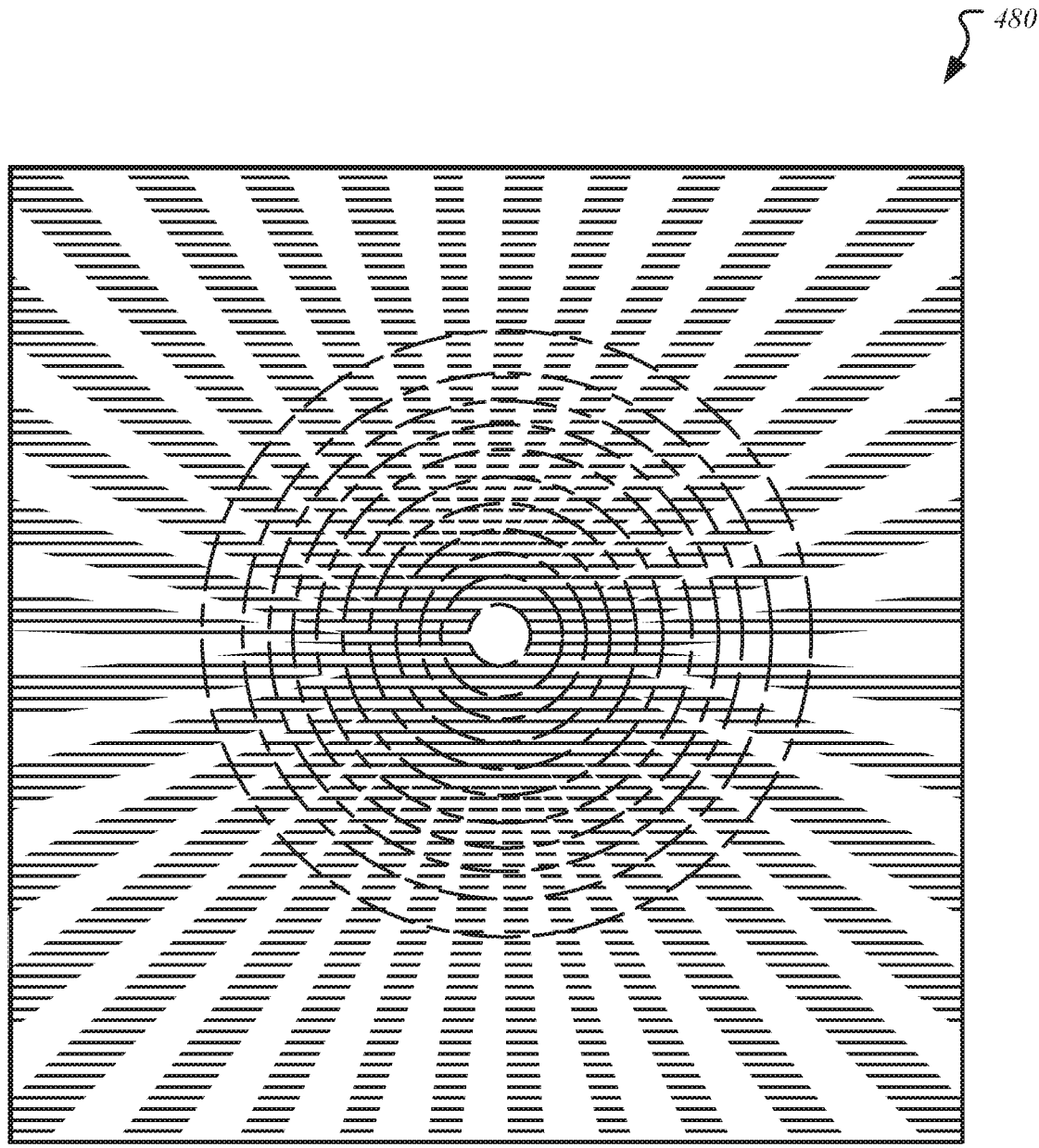

FIGS. 4F, 4G, 4H, 4I illustrate images as captured and processed according to one embodiment. For example, FIG. 4F illustrates target image 460 as captured using an imaging system, such as imaging system 400 of FIG. 4A based on one or more camera(s) 242 of FIG. 2. FIG. 4G illustrates center 465 of target image 460 of FIG. 4F. FIG. 4H illustrates a combination of four images 470 as combined and captured with diagonal ¼ pixel shift. FIG. 4I illustrates combined four images 480 based on the novel arrangement and shifting technique as described throughout this document.

Referring back to I/O source(s) 108 of FIG. 2, it is contemplated that embodiments are not limited to any number or type of microphone(s) 241, camera(s) 242, speaker(s) 243, display(s) 244, etc., for capture or presentation of data. For example, as facilitated by detection and monitoring logic 201, one or more of microphone(s) 241 may be used to detect speech or sound simultaneously from users, such as speakers. Similarly, as facilitated by detection and monitoring logic 201, one or more of camera(s) 242 may be used to capture images or videos of a geographic location (whether that be indoors or outdoors) and its associated contents (e.g., furniture, electronic devices, humans, animals, trees, mountains, etc.) and form a set of images or video streams.

Similarly, as illustrated, output component(s) 233 may include any number and type of speaker(s) or speaker device(s) 243 to serve as output devices for outputting or giving out audio from computing device 100 for any number or type of reasons, such as human hearing or consumption. For example, speaker(s) 243 work the opposite of microphone(s) 241 where speaker(s) 243 convert electric signals into sound.

Further, input component(s) 231 may include any number or type of cameras, such as depth-sensing cameras or capturing devices (e.g., Intel® RealSense™ depth-sensing camera) that are known for capturing still and/or video red-green-blue (RGB) and/or RGB-depth (RGB-D) images for media, such as personal media. Such images, having depth information, have been effectively used for various computer vision and computational photography effects, such as (without limitations) scene understanding, refocusing, composition, cinema-graphs, etc. Similarly, for example, displays may include any number and type of displays, such as integral displays, tensor displays, stereoscopic displays, etc., including (but not limited to) embedded or connected display screens, display devices, projectors, etc.

Input component(s) 231 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more input component(s) 231 may further include one or more of supporting or supplemental devices for capturing and/or sensing of data, such as illuminators (e.g., IR illuminator), light fixtures, generators, sound blockers, etc.

It is further contemplated that in one embodiment, input component(s) 231 may include any number and type of context sensors (e.g., linear accelerometer) for sensing or detecting any number and type of contexts (e.g., estimating horizon, linear acceleration, etc., relating to a mobile computing device, etc.). For example, input component(s) 231 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); and gravity gradiometers to study and measure variations in gravitation acceleration due to gravity, etc.

Further, for example, input component(s) 231 may include (without limitation): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.); biometric sensors (such as to detect fingerprints, etc.), calendar maintenance and reading device), etc.; global positioning system (GPS) sensors; resource requestor; and/or TEE logic. TEE logic may be employed separately or be part of resource requestor and/or an I/O subsystem, etc. Input component(s) 231 may further include voice recognition devices, photo recognition devices, facial and other body recognition components, voice-to-text conversion components, etc.

Similarly, output component(s) 233 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output component(s) 233 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

It is contemplated that embodiment are not limited to any number or type of use-case scenarios, architectural placements, or component setups; however, for the sake of brevity and clarity, illustrations and descriptions are offered and discussed throughout this document for exemplary purposes but that embodiments are not limited as such. Further, throughout this document, "user" may refer to someone having access to one or more computing devices, such as computing device 100, and may be referenced interchangeably with "person", "individual", "human", "him", "her", "child", "adult", "viewer", "player", "gamer", "developer", programmer", and/or the like.

Communication/compatibility logic 209 may be used to facilitate dynamic communication and compatibility between various components, networks, database(s) 225, and/or communication medium(s) 230, etc., and any number and type of other computing devices 250A, 250B, 250C, 260A, 260B, 260N (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, Internet, Internet of Things, intranet, cellular network, proximity networks, such as Bluetooth, Bluetooth low energy (BLE), Bluetooth Smart, Wi-Fi proximity, Radio Frequency Identification, Near Field Communication, Body Area Network, etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", "circuitry", and/or the like, may be referenced interchangeably and include, by way of example, software, hardware, firmware, and/or any combination thereof. In one example, "logic" may refer to or include a software component that works with one or more of an operating system, a graphics driver, etc., of a computing device, such as computing device 100. In another example, "logic" may refer to or include a hardware component that is capable of being physically installed along with or as part of one or more system hardware elements, such as an application processor, a graphics processor, etc., of a computing device, such as computing device 100. In yet another embodiment, "logic" may refer to or include a firmware component that is capable of being part of system firmware, such as firmware of an application processor or a graphics processor, etc., of a computing device, such as computing device 100.

Further, any use of a particular brand, word, term, phrase, name, and/or acronym, such as "camera", "sensor", "sensor arrangement", "multisensory super-resolution camera", "shifting", "pixels", "pixel centers", "low-resolution", "high-resolution", "RealSense™ camera", "real-time", "automatic", "dynamic", "user interface", "camera", "sensor", "microphone", "display screen", "speaker", "verification", "authentication", "privacy", "user", "user profile", "user preference", "sender", "receiver", "personal device", "smart device", "mobile computer", "wearable device", "IoT device", "proximity network", "cloud network", "server computer", etc., should not be read to limit embodiments to software or devices that carry that label in products or in literature external to this document.

It is contemplated that any number and type of components may be added to and/or removed from sensor arrangement mechanism 110 and/or one or more of sensor arrangement components 120, 130 of FIG. 1 to facilitate various embodiments including adding, removing, and/or enhancing certain features. For brevity, clarity, and ease of understanding of sensor arrangement mechanism 110 and/or one or more of sensor arrangement components 120, 130 of FIG. 1, many of the standard and/or known components, such as those of a computing device are not shown or discussed here. It is contemplated that embodiments, as described herein, are not limited to any technology, topology, system, architecture, and/or standard and are dynamic enough to adopt and adapt to any future changes.

Figure 5:
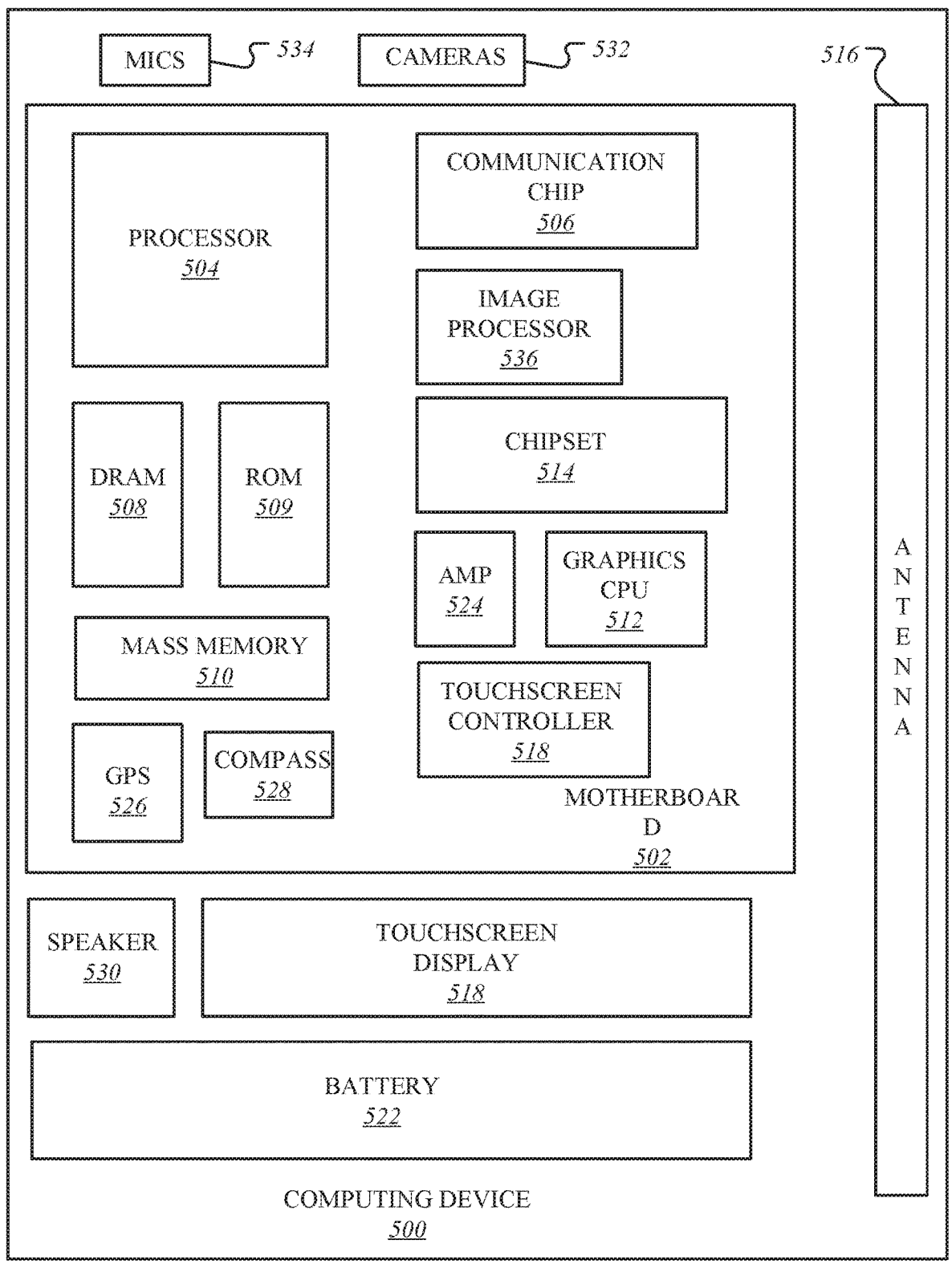
FIG. 5 illustrates a computing device capable of supporting and implementing one or more embodiments.

FIG. 5 illustrates a computing device 500 capable of supporting and implementing one or more embodiments. The illustrated computing device 500 may be same as or similar to computing devices 100, 250 of FIG. 2. The computing device 500 houses a system board 502. The board 502 may include a number of components, including but not limited to a processor 504 and at least one communication package 506. The communication package is coupled to one or more antennas 516. The processor 504 is physically and electrically coupled to the board 502.

Depending on its applications, computing device 500 may include other components that may or may not be physically and electrically coupled to the board 502. These other components include, but are not limited to, volatile memory (e.g., DRAM) 508, non-volatile memory (e.g., ROM) 509, flash memory (not shown), a graphics processor 512, a digital signal processor (not shown), a crypto processor (not shown), a chipset 514, an antenna 516, a display 518 such as a touchscreen display, a touchscreen controller 520, a battery 522, an audio codec (not shown), a video codec (not shown), a power amplifier 524, a global positioning system (GPS) device 526, a compass 528, an accelerometer (not shown), a gyroscope (not shown), a speaker 530, cameras 532, a microphone array 534, and a mass storage device (such as hard disk drive) 510, compact disk (CD) (not shown), digital versatile disk (DVD) (not shown), and so forth). These components may be connected to the system board 502, mounted to the system board, or combined with any of the other components.

The communication package 506 enables wireless and/or wired communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 506 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 500 may include a plurality of communication packages 506. For instance, a first communication package 506 may be dedicated to shorter range wireless communications such as Wi-Fi and Bluetooth and a second communication package 506 may be dedicated to longer range wireless communications such as GPS, EDGE, GPRS, CDMA, WiMAX, LTE, Ev-DO, and others.

The cameras 532 including any depth sensors or proximity sensor are coupled to an optional image processor 536 to perform conversions, analysis, noise reduction, comparisons, depth or distance analysis, image understanding, and other processes as described herein. The processor 504 is coupled to the image processor to drive the process with interrupts, set parameters, and control operations of image processor and the cameras. Image processing may instead be performed in the processor 504, the graphics CPU 512, the cameras 532, or in any other device.

In various implementations, the computing device 500 may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 500 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Figure 6A:
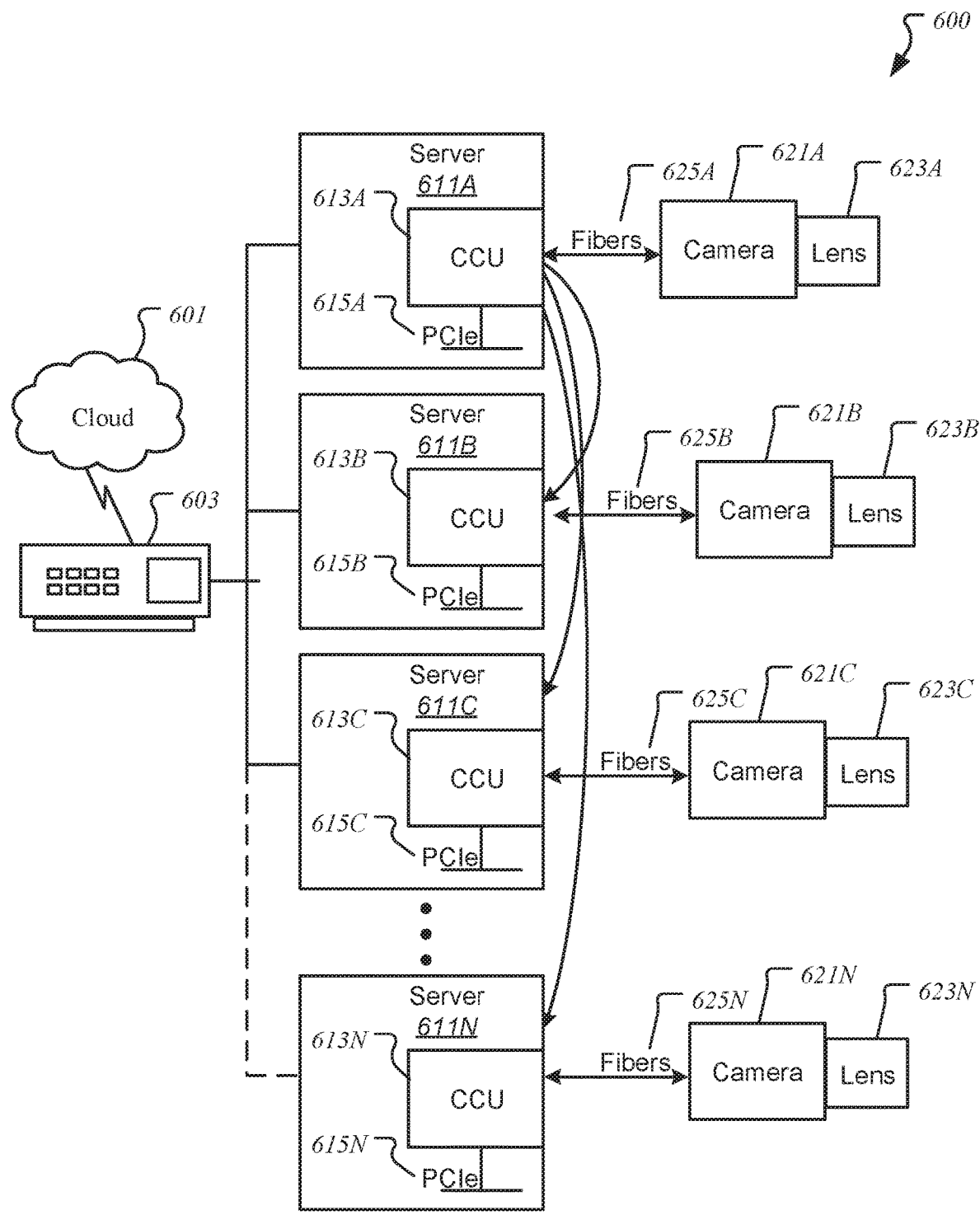
FIG. 6A illustrates a multi-camera system according to one embodiment.

FIG. 6A illustrates a multi-camera system 600 according to one embodiment. For the sake of brevity, many of the details previously mentioned or discussed with reference to FIGS. 1-5 may not be discussed or repeated hereafter. Further, it is contemplated that any processes or transactions with this and other illustrations may be performed by processing logic that may comprise hardware (e.g., circuitry, dedicated logic, programmable logic, etc.), software (such as instructions run on a processing device), or a combination thereof, as facilitated by sensor arrangement mechanism 110 and/or one or more of sensor arrangement components 120, 130 of FIG. 1. Any processes or transactions associated with this and other illustrations may be illustrated or recited in linear sequences for brevity and clarity in presentation; however, it is contemplated that any number of them can be performed in parallel, asynchronously, or in different orders.

As an initial matter, embodiments are not limited to the illustrated system 600 or any other similar system. As illustrated, any number and type of cameras 621A, 621B, 621C, 621N may be employed in a multi-camera system, such as system 600, for capturing the pertinent scenes and obtaining optimal coverage of the scenes through their lenses 623A, 623B, 623C, 623N, respectively. For example, cameras 621A-621N may be the same as or include one or more of camera(s) 242 of FIG. 2 associated with their respective computing systems, such as servers 611A, 611B, 611C, 611N, where these servers 611A-611N may be the same as or include computing device 100 of FIG. 1. It is further contemplated that server 611A-611N may be in communication with another server computing device 603 over one or more types of networks, such as cloud 601, where cloud 601 may be the same as or part of one or more communication medium(s) 230 of FIG. 2.

In some embodiments, servers 611A-611N host camera control units (CCU), such as CCUs 613A, 613B, 613C, 613N, in communication through fabrics, such as PCIe 615A, 615B, 615C, 615N, respectively, where servers 611A-611N are synchronized with each other and further in communication with cameras 621A-621N through fibers 625A, 625B, 625C, 625N, respectively.

In some embodiments, cameras 621A-621N include sensors that are complementary metal oxide semiconductor (CMOS) type or charge coupled device (CCD) types, etc., and support global shutter, while camera optics support full frame, such as 35 mm or any other optical format sensors, and enable integration of high-resolution sensors. As discussed earlier in this document, each camera 621A-621N may include or be associated with multiple image sensors, such as four sensors, to achieve the pertinent resolutions and frame rates, while supporting the aggregation of sensor outputs to a large format image, allowing multiplying the output resolutions. Cameras 621A-621N are capable of capturing scenes with various lighting conditions and obtaining dynamic range, where, for example, the output image does not introduce any artifacts or other degradations of image quality when compared to other image captures.

For example, each of CCUs 613A-613N is capable of simultaneously outputting video data streams of: 32K super resolution or/and 8K resolution compressed or not compressed. Further, for example, system 600 may include pixel binning, bad pixels correction, dark frame subtract, lens distortion correction, lens shading correction, chromatic aberration correction, demosaic, gamma correction, white balance, color space converting, color correction, sharpening, temporal and spatial noise reduction, local tone mapping, scaling (shrink/zoom), image statistics histogram, minimum/maximum, automatic exposure, image stabilization, compression, and encoding, etc.

Figure 6B:
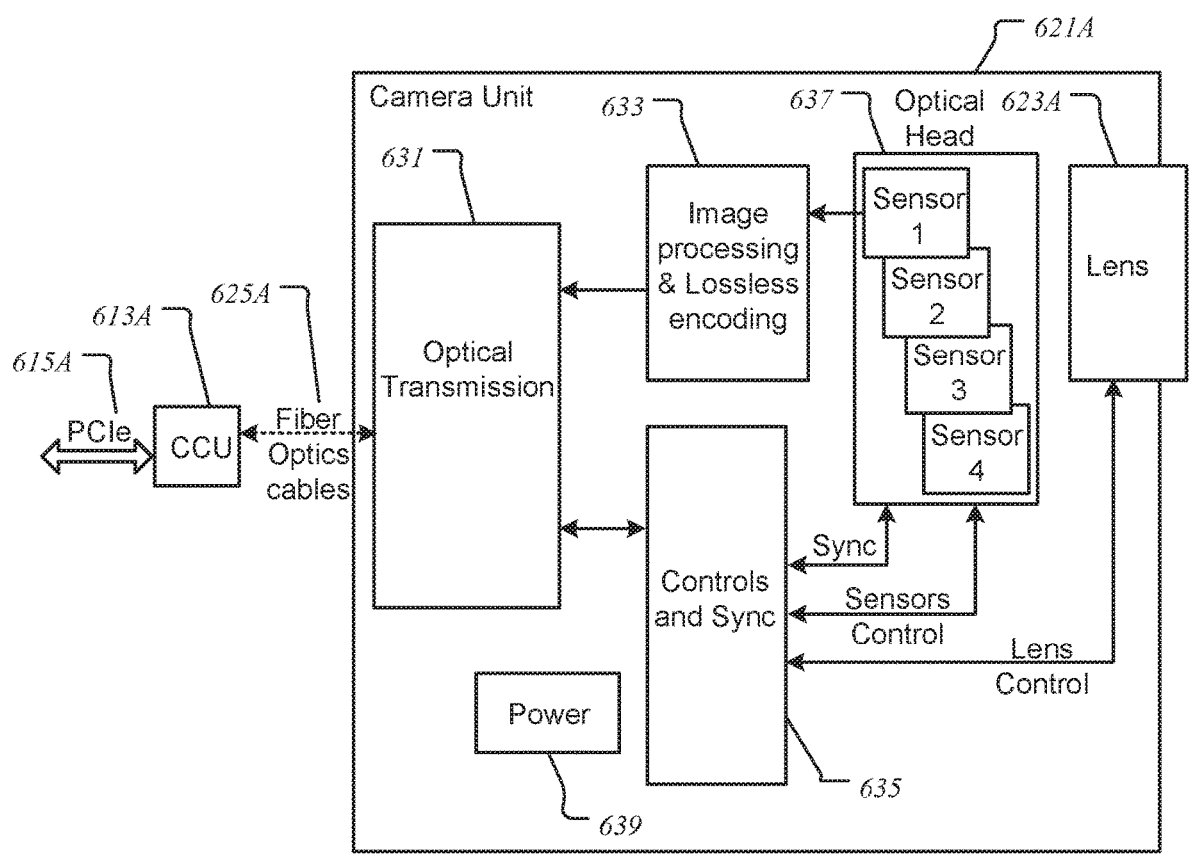
FIG. 6B illustrates a camera unit according to one embodiment.

FIG. 6B illustrates camera unit 621A of FIG. 6A according to one embodiment. For the sake of brevity, many of the details previously mentioned or discussed with reference to FIGS. 1-6A may not be discussed or repeated hereafter.

Camera unit 621A is in communication with and instructed by CCU 613A over 625A and further over PCIe 615A. Along with lens 623A, camera unit 621A further includes optical transmission unit 631, image processing and lossless encoding unit 633, control and synchronization unit 635, optical head 637, and power unit 639. It is contemplated that camera unit 621A may further include accelerometer sensors for electronic image stabilization assistance, temperature measurement and control for preventing overheating, Wi-Fi modules for transmitting videos to client computing devices, such as laptops, tablets, smartphones, etc., etc.

Similarly, it is contemplated that lens 623A may include an optical resolution lens that supports and is compatible with various virtual pixel sizes along with different apertures, visibility ranges, operating temperatures, humidity levels, etc. CCU 613A may be equipped to support various functionalities, such as receiving video streams from camera unit 621A via fiber optic cable 625A, applying image processing and compression on the received video streams, generating synchronization signals (e.g., triggers) for simultaneous grabbing of video streams from multiple cameras (e.g., host triggers nodes), transmitting video streams via PCIe bus 615A, and sending camera and lens control commands from server computer to camera unit 621A via fiber optic cable 625A.

Figure 6C:
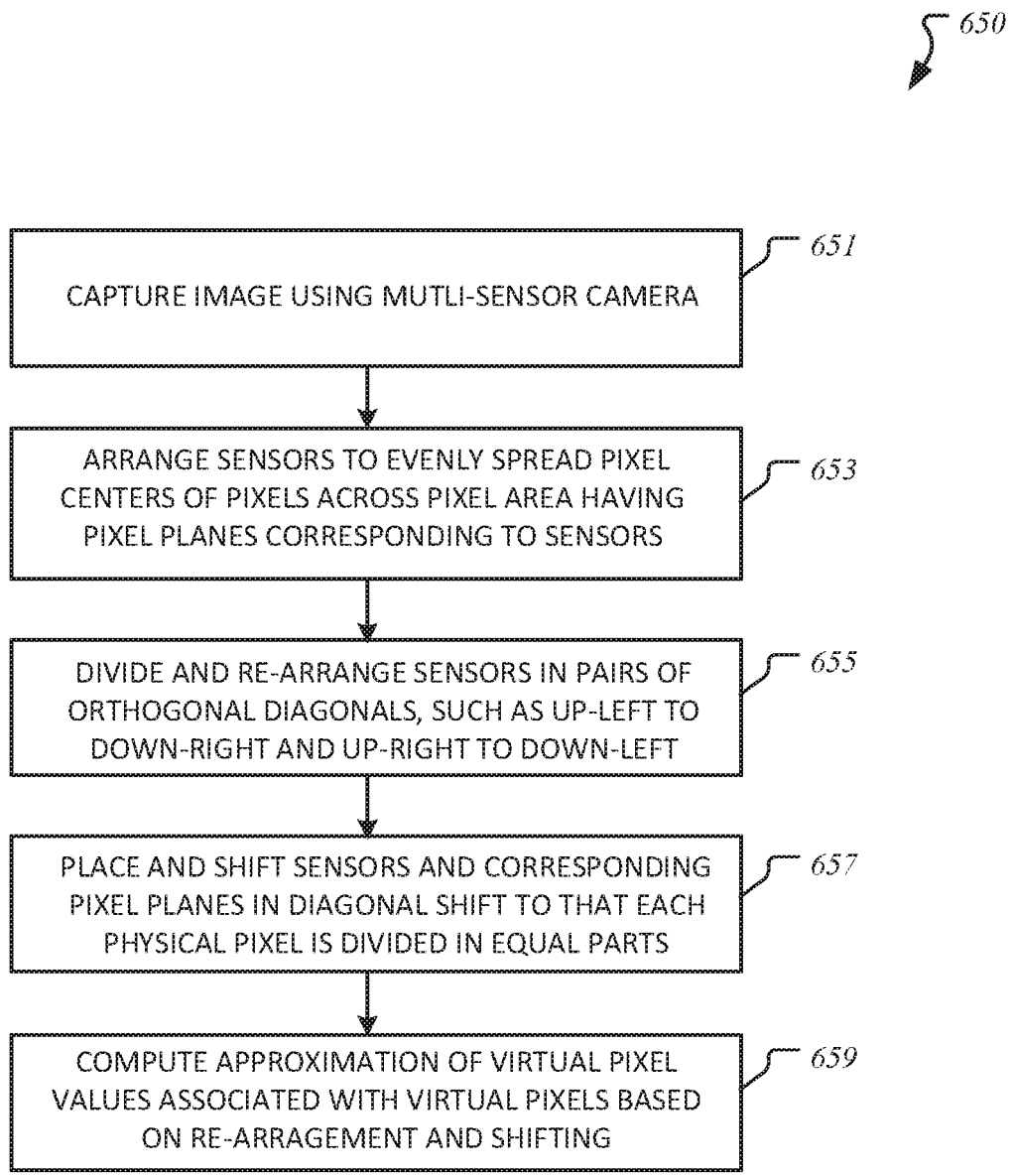
FIG. 6C illustrates a method for arrangement and shifting of sensors according to one embodiment.

FIG. 6C illustrates a method 650 for arrangement and shifting of sensors according to one embodiment. For the sake of brevity, many of the details previously mentioned or discussed with reference to FIGS. 1-6B may not be discussed or repeated hereafter. Further, it is contemplated that any processes or transactions with this and other illustrations may be performed by processing logic that may comprise hardware (e.g., circuitry, dedicated logic, programmable logic, etc.), software (such as instructions run on a processing device), or a combination thereof, as facilitated by sensor arrangement mechanism 110 and/or one or more of sensor arrangement components 120, 130 of FIG. 1. Any processes or transactions associated with this and other illustrations may be illustrated or recited in linear sequences for brevity and clarity in presentation; however, it is contemplated that any number of them can be performed in parallel, asynchronously, or in different orders.

Method 650 begins at block 651 with capturing of an image using a camera have multiple sensors. At block 653, the sensors are arranged to evenly spread the pixel centers while keeping the virtual pixels in equal sizes of the physical pixels, such as ¼×¼. At block 655, the sensors are further arranged (or rearranged) in pairs of orthogonal diagonals, such as up-left to down-right and up-right to down-left. At block 657, placing and shifting the pairs of pixels in a diagonal shift of ¼ against one another so that each physical pixel is divided to equal parts (such as 16 parts) by the sensor shift, which allows for an even more evenly spread of the pixel centers. At block 659, computing the approximation of virtual pixel values based on this rearrangement and shift.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes an apparatus to facilitate sensors arrangement and shifting for multisensory super-resolution cameras in imaging environments, the apparatus comprising: one or more processors coupled to memory, the one or more processors to: arrange sensors of a camera such that pixel centers of pixels of an image are spread evenly across a pixel area having pixel planes corresponding to the sensors, wherein the image is captured by the camera; re-arrange the sensors by dividing the sensors in pairs of sensors, wherein each pair of sensors corresponds to a pair of pixel planes; and shift the sensors diagonally such that the corresponding pixel planes are adjusted accordingly for improving quality of the image.

Example 2 includes the subject matter of Example 1, wherein the sensors are re-arranged while maintaining virtual pixels in equal size as that of physical pixels.

Example 3 includes the subject matter of Examples 1-2, wherein shifting comprises dividing the physical pixels in equal parts to allow for spreading the pixel centers evenly across the pixel area.

Example 4 includes the subject matter of Examples 1-3, wherein the pairs of sensors and pixel planes include pairs are shifted based on orthogonal diagonals including up-left to down-right and up-right to down-left.

Example 5 includes the subject matter of Examples 1-4, wherein the one or more processors are further to approximate virtual pixel values associated with the virtual pixels based on the re-arrangement and shifting of the sensors.

Example 6 includes the subject matter of Examples 1-5, wherein improving the quality comprises turning the image from being a low-resolution image to a high-resolution image to be viewed using a display device, wherein the camera includes a multi-sensor camera having four sensors including a first sensor associated with a red light, a second sensor and a third sensor associated with a green light, and a fourth sensor associated with a blue light, wherein the camera includes a splitter to split the green light to be captured by the second and third sensors.

Example 7 includes the subject matter of Examples 1-6, wherein the one or more processors co-located on a common semiconductor package include one or more of a central processing unit and a graphics processing unit.

Some embodiments pertain to Example 8 that includes a method facilitating sensors arrangement and shifting for multisensory super-resolution cameras in imaging environments, the method comprising: arranging sensors of a camera such that pixel centers of pixels of an image are spread evenly across a pixel area having pixel planes corresponding to the sensors, wherein the image is captured by the camera; re-arranging the sensors by dividing the sensors in pairs of sensors, wherein each pair of sensors corresponds to a pair of pixel planes; and shifting the sensors diagonally such that the corresponding pixel planes are adjusted accordingly for improving quality of the image.

Example 9 includes the subject matter of Example 8, wherein the sensors are re-arranged while maintaining virtual pixels in equal size as that of physical pixels.

Example 10 includes the subject matter of Examples 8-9, wherein shifting comprises dividing the physical pixels in equal parts to allow for spreading the pixel centers evenly across the pixel area.

Example 11 includes the subject matter of Examples 8-10, wherein the pairs of sensors and pixel planes include pairs are shifted based on orthogonal diagonals including up-left to down-right and up-right to down-left.

Example 12 includes the subject matter of Examples 8-11, wherein the one or more processors are further to approximate virtual pixel values associated with the virtual pixels based on the re-arrangement and shifting of the sensors.

Example 13 includes the subject matter of Examples 8-12, wherein improving the quality comprises turning the image from being a low-resolution image to a high-resolution image to be viewed using a display device, wherein the camera includes a multi-sensor camera having four sensors including a first sensor associated with a red light, a second sensor and a third sensor associated with a green light, and a fourth sensor associated with a blue light, wherein the camera includes a splitter to split the green light to be captured by the second and third sensors.

Example 14 includes the subject matter of Examples 8-13, wherein the method is facilitated by one or more processors co-located on a common semiconductor package, the one or more processors include one or more of a central processing unit and a graphics processing unit.

Some embodiments pertain to Example 15 that includes a data processing system comprising memory; and one or more processors coupled to the memory, the one or more processors to: arranging sensors of a camera such that pixel centers of pixels of an image are spread evenly across a pixel area having pixel planes corresponding to the sensors, wherein the image is captured by the camera; re-arranging the sensors by dividing the sensors in pairs of sensors, wherein each pair of sensors corresponds to a pair of pixel planes; and shifting the sensors diagonally such that the corresponding pixel planes are adjusted accordingly for improving quality of the image.

Example 16 includes the subject matter of Example 15, wherein the sensors are re-arranged while maintaining virtual pixels in equal size as that of physical pixels.

Example 17 includes the subject matter of Examples 15-16, wherein shifting comprises dividing the physical pixels in equal parts to allow for spreading the pixel centers evenly across the pixel area.

Example 18 includes the subject matter of Examples 15-17, wherein the pairs of sensors and pixel planes include pairs are shifted based on orthogonal diagonals including up-left to down-right and up-right to down-left.

Example 19 includes the subject matter of Examples 15-18, wherein the one or more processors are further to approximate virtual pixel values associated with the virtual pixels based on the re-arrangement and shifting of the sensors.

Example 20 includes the subject matter of Examples 15-20, wherein improving the quality comprises turning the image from being a low-resolution image to a high-resolution image to be viewed using a display device, wherein the camera includes a multi-sensor camera having four sensors including a first sensor associated with a red light, a second sensor and a third sensor associated with a green light, and a fourth sensor associated with a blue light, wherein the camera includes a splitter to split the green light to be captured by the second and third sensors.

Example 21 includes the subject matter of Examples 8-20, wherein the one or more processors co-located on a common semiconductor package include one or more of a central processing unit and a graphics processing unit.

Some embodiments pertain to Example 22 that includes an apparatus facilitating sensors arrangement and shifting for multisensory super-resolution cameras in imaging environments, the apparatus comprising: means for arranging sensors of a camera such that pixel centers of pixels of an image are spread evenly across a pixel area having pixel planes corresponding to the sensors, wherein the image is captured by the camera; means for re-arranging the sensors by dividing the sensors in pairs of sensors, wherein each pair of sensors corresponds to a pair of pixel planes; and means for shifting the sensors diagonally such that the corresponding pixel planes are adjusted accordingly for improving quality of the image.

Example 23 includes the subject matter of Example 22, wherein the sensors are re-arranged while maintaining virtual pixels in equal size as that of physical pixels.

Example 24 includes the subject matter of Examples 22-23, wherein shifting comprises dividing the physical pixels in equal parts to allow for spreading the pixel centers evenly across the pixel area.

Example 25 includes the subject matter of Examples 22-24, wherein the pairs of sensors and pixel planes include pairs are shifted based on orthogonal diagonals including up-left to down-right and up-right to down-left.

Example 26 includes the subject matter of Examples 22-25, wherein the one or more processors are further to approximate virtual pixel values associated with the virtual pixels based on the re-arrangement and shifting of the sensors.

Example 27 includes the subject matter of Examples 22-26, wherein improving the quality comprises turning the image from being a low-resolution image to a high-resolution image to be viewed using a display device, wherein the camera includes a multi-sensor camera having four sensors including a first sensor associated with a red light, a second sensor and a third sensor associated with a green light, and a fourth sensor associated with a blue light, wherein the camera includes a splitter to split the green light to be captured by the second and third sensors.

Example 28 includes the subject matter of Examples 22-27, the apparatus comprising one or more processors co-located on a common semiconductor package, the one or more processors include one or more of a central processing unit and a graphics processing unit.

Example 29 includes at least one non-transitory or tangible machine-readable medium comprising a plurality of instructions, when executed on a computing device, to implement or perform a method as claimed in any of claims or examples 8-14.

Example 30 includes at least one machine-readable medium comprising a plurality of instructions, when executed on a computing device, to implement or perform a method as claimed in any of claims or examples 8-14.

Example 31 includes a system comprising a mechanism to implement or perform a method as claimed in any of claims or examples 8-14.

Example 32 includes an apparatus comprising means for performing a method as claimed in any of claims or examples 8-14.

Example 33 includes a computing device arranged to implement or perform a method as claimed in any of claims or examples 8-14.

Example 34 includes a communications device arranged to implement or perform a method as claimed in any of claims or examples 8-14.

Example 35 includes at least one machine-readable medium comprising a plurality of instructions, when executed on a computing device, to implement or perform a method or realize an apparatus as claimed in any preceding claims.

Example 36 includes at least one non-transitory or tangible machine-readable medium comprising a plurality of instructions, when executed on a computing device, to implement or perform a method or realize an apparatus as claimed in any preceding claims.

Example 37 includes a system comprising a mechanism to implement or perform a method or realize an apparatus as claimed in any preceding claims.

Example 38 includes an apparatus comprising means to perform a method as claimed in any preceding claims.

Example 39 includes a computing device arranged to implement or perform a method or realize an apparatus as claimed in any preceding claims.

Example 40 includes a communications device arranged to implement or perform a method or realize an apparatus as claimed in any preceding claims.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
   one or more processors coupled to memory, the one or more processors to:
   arrange sensors of a camera such that pixel centers of pixels of an image are spread evenly across a pixel area having pixel planes corresponding to the sensors, wherein the image is captured by the camera;
   re-arrange the sensors by dividing the sensors in pairs of sensors, wherein each pair of sensors corresponds to a pair of pixel planes, wherein the sensors are re-arranged such that the pixel centers are spread evenly across the pixel area while maintaining virtual pixels of the pixels equal to a portion in size of physical pixels of the pixels; and
   shift the sensors diagonally such that the corresponding pixel planes are adjusted accordingly for improving quality of the image.

2. The apparatus of claim 1, wherein shifting comprises dividing the physical pixels in equal parts to allow for spreading the pixel centers evenly across the pixel area, wherein the portion includes at least one of one-quarter, one-third, and one-half.

3. The apparatus of claim 1, wherein the pairs of sensors and pixel planes include pairs are shifted based on orthogonal diagonals including up-left to down-right and up-right to down-left.

4. The apparatus of claim 1, wherein the one or more processors are further to approximate virtual pixel values associated with the virtual pixels based on the re-arrangement and shifting of the sensors.

5. The apparatus of claim 1, wherein improving the quality comprises turning the image from being a low-resolution image to a high-resolution image to be viewed using a display device, wherein the camera includes a multi-sensor camera having four sensors including a first sensor associated with a red light, a second sensor and a third sensor associated with a green light, and a fourth sensor associated with a blue light, wherein the camera includes a splitter to split the green light to be captured by the second and third sensors.

6. The apparatus of claim 1, wherein the one or more processors co-located on a common semiconductor package include one or more of a central processing unit and a graphics processing unit.

7. A method comprising:
   arranging sensors of a camera such that pixel centers of pixels of an image are spread evenly across a pixel area having pixel planes corresponding to the sensors, wherein the image is captured by the camera;
   re-arranging the sensors by dividing the sensors in pairs of sensors, wherein each pair of sensors corresponds to a pair of pixel planes, wherein the sensors are re-arranged such that the pixel centers are spread evenly across the pixel area while maintaining virtual pixels of the pixels equal to a portion in size of physical pixels of the pixels; and
   shifting the sensors diagonally such that the corresponding pixel planes are adjusted accordingly for improving quality of the image.

8. The method of claim 7, wherein shifting comprises dividing the physical pixels in equal parts to allow for spreading the pixel centers evenly across the pixel area, wherein the portion includes at least one of one-quarter, one-third, and one-half.

9. The method of claim 7, wherein the pairs of sensors and pixel planes include pairs are shifted based on orthogonal diagonals including up-left to down-right and up-right to down-left.

10. The method of claim 7, wherein the one or more processors are further to approximate virtual pixel values associated with the virtual pixels based on the re-arrangement and shifting of the sensors.

11. The method of claim 7, wherein improving the quality comprises turning the image from being a low-resolution image to a high-resolution image to be viewed using a display device, wherein the camera includes a multi-sensor camera having four sensors including a first sensor associated with a red light, a second sensor and a third sensor associated with a green light, and a fourth sensor associated with a blue light, wherein the camera includes a splitter to split the green light to be captured by the second and third sensors.

12. The method of claim 7, wherein the method is facilitated by one or more processors co-located on a common semiconductor package, the one or more processors include one or more of a central processing unit and a graphics processing unit.

13. At least one non-transitory machine-readable medium comprising instructions which, when executed by a machine, cause the machine to perform operations comprising:
    arranging sensors of a camera such that pixel centers of pixels of an image are spread evenly across a pixel area having pixel planes corresponding to the sensors, wherein the image is captured by the camera;
    re-arranging the sensors by dividing the sensors in pairs of sensors, wherein each pair of sensors corresponds to a pair of pixel planes, wherein the sensors are re-arranged such that the pixel centers are spread evenly across the pixel area while maintaining virtual pixels of the pixels equal to a portion in size of physical pixels of the pixels; and
    shifting the sensors diagonally such that the corresponding pixel planes are adjusted accordingly for improving quality of the image.

14. The non-transitory machine-readable medium of claim 13, wherein shifting comprises dividing the physical pixels in equal parts to allow for spreading the pixel centers evenly across the pixel area, wherein the portion includes at least one of one-quarter, one-third, and one-half.

15. The non-transitory machine-readable medium of claim 13, wherein the pairs of sensors and pixel planes include pairs are shifted based on orthogonal diagonals including up-left to down-right and up-right to down-left.

16. The non-transitory machine-readable medium of claim 13, wherein the one or more processors are further to approximate virtual pixel values associated with the virtual pixels based on the re-arrangement and shifting of the sensors.

17. The non-transitory machine-readable medium of claim 13, wherein improving the quality comprises turning the image from being a low-resolution image to a high-resolution image to be viewed using a display device, wherein the camera includes a multi-sensor camera having four sensors including a first sensor associated with a red light, a second sensor and a third sensor associated with a green light, and a fourth sensor associated with a blue light, wherein the camera includes a splitter to split the green light to be captured by the second and third sensors, wherein the machine comprises one or more processors co-located on a common semiconductor package, the one or more processors include one or more of a central processing unit and a graphics processing unit.

\* \* \* \* \*